United States Patent
Naoi

(10) Patent No.: US 7,812,837 B2
(45) Date of Patent: Oct. 12, 2010

(54) REDUCED Z-BUFFER GENERATING METHOD, HIDDEN SURFACE REMOVAL METHOD AND OCCLUSION CULLING METHOD

(75) Inventor: Junichi Naoi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 626 days.

(21) Appl. No.: 11/741,945

(22) Filed: Apr. 30, 2007

(65) Prior Publication Data

US 2007/0268290 A1 Nov. 22, 2007

(30) Foreign Application Priority Data

May 22, 2006 (JP) ............................ 2006-141473

(51) Int. Cl.
*G06T 15/40* (2006.01)
(52) U.S. Cl. ...................................... 345/422; 345/421
(58) Field of Classification Search ........................ None
See application file for complete search history.

(56) References Cited

U.S. PATENT DOCUMENTS

| | | | | |
|---|---|---|---|---|
| 5,600,763 | A * | 2/1997 | Greene et al. | ................ 345/420 |
| 6,359,623 | B1 | 3/2002 | Larson | |
| 6,456,285 | B2 * | 9/2002 | Hayhurst | .................... 345/422 |
| 6,720,964 | B1 * | 4/2004 | Fowler et al. | ................ 345/422 |
| 7,023,437 | B1 * | 4/2006 | Voorhies et al. | ............. 345/420 |
| 7,310,098 | B2 | 12/2007 | Oba | |
| 7,450,120 | B1 * | 11/2008 | Hakura et al. | ................ 345/421 |
| 2003/0151606 | A1 * | 8/2003 | Morein | ........................ 345/422 |
| 2006/0209065 | A1 * | 9/2006 | Lapidous et al. | ............ 345/422 |

FOREIGN PATENT DOCUMENTS

| JP | 2000149055 A | 5/2000 |
|---|---|---|
| JP | 2004348702 A | 12/2004 |

OTHER PUBLICATIONS

Greene, N., Kass, M., and Miller, G. 1993. Hierarchical Z-buffer visibility. In Proceedings of the 20th Annual Conference on Computer Graphics and interactive Techniques (Anaheim, CA, Aug. 2-6, 1993). SIGGRAPH '93. ACM, New York, NY.*

* cited by examiner

*Primary Examiner*—Daniel F Hajnik
(74) *Attorney, Agent, or Firm*—Matthew B. Dernier, Esq.; Gibson & Dernier LLP

(57) ABSTRACT

A rendering processing apparatus is provided which performs occlusion culling for excluding from rendering targets a hidden object behind another object as seen from a point of view, when given a plurality of objects. An object input unit stores a plurality of objects in an object storing unit. An internal volume generating unit generates an internal volume which is included in a target object. A reduced Z-buffer updating unit updates a reduced Z-buffer based on the internal volume. An external volume generating unit generates an external volume which includes the target object subject to culling test. A culling determination unit consults the reduced Z-buffer and performs a Z culling test on the target object based on the external volume.

3 Claims, 14 Drawing Sheets

410  310  200

500

| 8 | 10 | 12 | 12 |
|---|---|---|---|
| 11 | 12 | 14 | 13 |
| 10 | 13 | 15 | 10 |
| 11 | 11 | 12 | 10 |

502

| 15 | 15 | 15 | 15 |
|---|---|---|---|
| 15 | 15 | 15 | 15 |
| 15 | 15 | 15 | 15 |
| 15 | 15 | 15 | 15 |

502

REDUCED Z-BUFFER GENERATING METHOD, HIDDEN SURFACE REMOVAL METHOD AND OCCLUSION CULLING METHOD

BACKGROUND OF THE INVENTION

1. Field of the Invention

This invention relates to a reduced Z-buffer generating technology, a hidden surface removal technology, an occlusion culling technology, and a rendering processing technology in computer graphics.

2. Description of the Related Art

When rendering three-dimensional objects in 3D computer graphics, a hidden surface removal process is performed to remove hidden surfaces behind other objects. Z-buffer method is one of typical techniques for the hidden surface removal process. In the Z-buffer method, the hidden surface removal process is performed by: retrieving the per-pixel Z value from a Z-buffer which contains Z values or depth information pixel by pixel on screen; and rendering a target pixel to be processed if the pixel lies in front of the position indicated by the corresponding per-pixel Z value, and canceling rendering processing for the target pixel if the pixel lies behind the position.

The Z-buffer method requires as much memory capacity as that of a frame buffer which stores the color values of the pixels. The frame buffer will not be accessed where target pixels subject to hidden surface removal are concerned, since the pixel values of those pixels need not be written. The Z-buffer, on the other hand, must be consulted for Z values to perform a Z test even on pixels that end up being subjected to hidden surface removal, thus resulting in a higher processing cost.

Since the Z-buffer method requires a large memory capacity and a high processing cost, various ideas have recently been devised to reduce the cost involved in the hidden surface removal process as much as possible. For example, occlusion culling is performed to select a hidden object behind the other objects and exclude it from rendering targets in advance. The occlusion culling makes it possible to choose rendering targets on a per-object or per-polygon basis for the purpose of reduction at an earlier stage prior to a rasterization process.

Moreover, an early Z culling may be performed to remove hidden and invisible fragments at the stage of generating fragments prior to pixel processing. A hierarchical Z culling may also be performed, which uses a hierarchical Z-buffer including different resolutions of Z-buffers stacked hierarchically. These techniques make the hidden surface removal process more efficient.

One of the occlusion culling methods is to form a bounding volume around an object so as to include the object, and exclude the object from rendering targets if its bounding volume is entirely hidden behind the bounding volumes of the other objects. This requires the computation, prior to rasterization process, to detect whether or not a bounding volume is entirely hidden behind the other bounding volumes on screen coordinates. The occlusion culling process increases in difficulty as the recent 3D graphics utilizes an enormous number of objects to be rendered and the positional relationship between the objects is more complicated.

The Z culling using a hierarchical Z-buffer also leads to a high computation cost. The generation of the hierarchical Z-buffer requires the process for providing a per-pixel Z-buffer and then reducing its resolution stepwise so as to generate Z-buffers having the different resolutions.

SUMMARY OF THE INVENTION

The present invention has been achieved in view of the foregoing problems, and a general purpose thereof is to provide a rendering processing technology capable of enhancing the efficiency of rendering processing according to the positional relationship of a plurality of three-dimensional objects in a depth direction.

To solve the foregoing problems, one embodiment of the present invention provides a reduced Z-buffer generating method. The method includes: providing a reduced Z-buffer which contains representative Z values for determining a positional relationship between plural objects or fragments constituting the objects in a depth direction, the representative Z values indicating a depth from the point of view in units of predetermined pixel blocks each including a plurality of neighboring pixels; and comparing the Z values of respective rasterized pixels in a pixel block of an object or a fragment to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block.

Yet another embodiment of the present invention provides an occlusion culling method for excluding from rendering targets a hidden object behind another objects as seen from a point of view, when given a plurality of objects. The method includes: providing a reduced Z-buffer which contains representative Z values for determining a positional relationship between the objects in a depth direction, the representative Z values indicating a depth from the point of view in units of predetermined pixel blocks each including a plurality of neighboring pixels; comparing the Z values of respective rasterized pixels in a pixel block of an object to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block; and determining that the object has a possibility of being rendered if it turns out that at least one of the pixel blocks of the object to be rendered has any rasterized pixel having a Z value that indicates lying closer to the point of view than the representative Z value of a corresponding pixel block stored in the Z-buffer does.

Yet another embodiment of the present invention provides a hidden surface removal method for removing a hidden surface behind another object as seen from a point of view, when given a plurality of objects. the method includes: providing a reduced Z-buffer which contains representative Z values for determining a positional relationship between fragments constituting the plurality of objects in a depth direction, the representative Z values indicating a depth from the point of view in units of predetermined pixel blocks each including a plurality of neighboring pixels; comparing the Z values of respective rasterized pixels in a pixel block of a fragment to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block;

and determining that the fragment has the possibility of being rendered if it turns out that at least one of the pixel blocks of the fragment to be rendered has any rasterized pixel having a Z value that indicates lying closer to the point of view than the representative Z value of a corresponding pixel block stored in the Z-buffer does.

It should be appreciated that any combinations of the foregoing components, and any conversions of expressions of the present invention from/into methods, apparatuses, systems, computer programs, data structures, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1A:
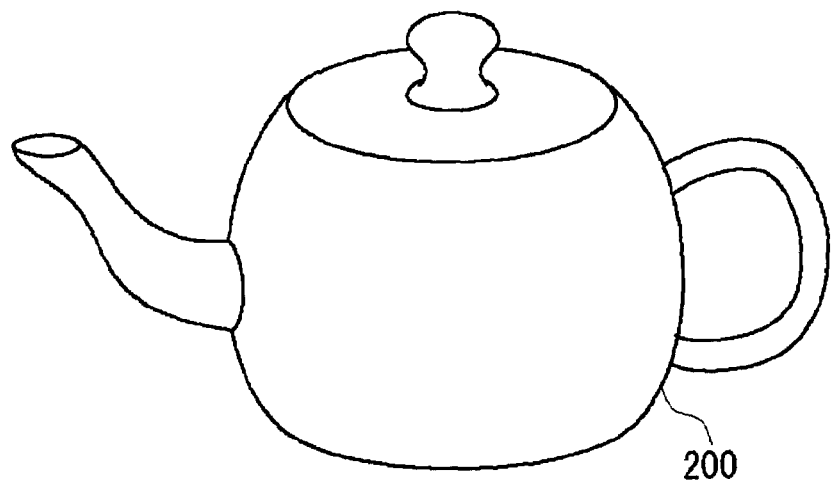
FIG. 1A illustrates an object given as a rendering target.

The invention will now be described by reference to the preferred embodiments. This does not intend to limit the scope of the present invention, but to exemplify the invention.

An overview will now be given of an embodiment of the present invention. When given a set of objects to be rendered, the embodiment provides an occlusion culling method for excluding from rendering targets a hidden object behind the other objects when seen from a point of view. The following means will be used for the occlusion culling according to the embodiment.

(1) A reduced Z-buffer which contains representative Z values for determining a positional relationship between the objects in a depth direction. The representative Z value indicates a depth from the point of view in units of pixel blocks each of which contains a plurality of neighboring pixels.

(2) An external volume and an internal volume. When given a target object to be determined whether or not there is any possibility of being actually rendered, the external volume includes the target object therein and the target object includes the internal volume therein.

The representative Z values of the reduced Z-buffer are updated using the internal volume as follows. The per-pixel Z values in a pixel block of the internal volume to be rendered are compared with the representative Z value of a corresponding pixel block stored in the reduced Z-buffer. If the largest value among the per-pixel Z values within the pixel block is smaller than the representative Z value of the pixel block, the representative Z value of the pixel block is updated with the largest per-pixel Z value in the pixel block.

A test for the object culling is performed using the reduced Z-buffer based on the external volume as follows. It is determined that the object has a possibility of being rendered if it turns out that at least one of pixel blocks of the external volume to be rendered has any one per-pixel Z value that is smaller than the per-pixel-block representative Z value of the corresponding pixel block stored in the reduced Z-buffer. Conversely, the object is excluded from rendering targets and culled out if the smallest per-pixel Z value within every pixel block of the external volume to be rendered is greater than the per-pixel-block representative Z value of the corresponding pixel block stored in the reduced Z-buffer.

In this way, an object subject to the rendering test is provided with two bounding volumes, i.e., the external volume and the internal volume, and the per-pixel Z values of those volumes and the per-pixel-block representative Z value of the reduced Z-buffer are compared for the hidden surface removal process. Consequently, objects that will not be rendered are screened out in advance, so that only those having the possibility of being rendered are rasterized for subsequent rendering processing. This speeds up the entire rendering processing.

Hereinafter, the setting up of the external volume and the internal volume, the Z culling using the external volume and the reduced Z-buffer, and the updating of the reduced Z-buffer using the internal volume will now be described in detail.

[1] External Volume and Internal Volume

Figure 1B:
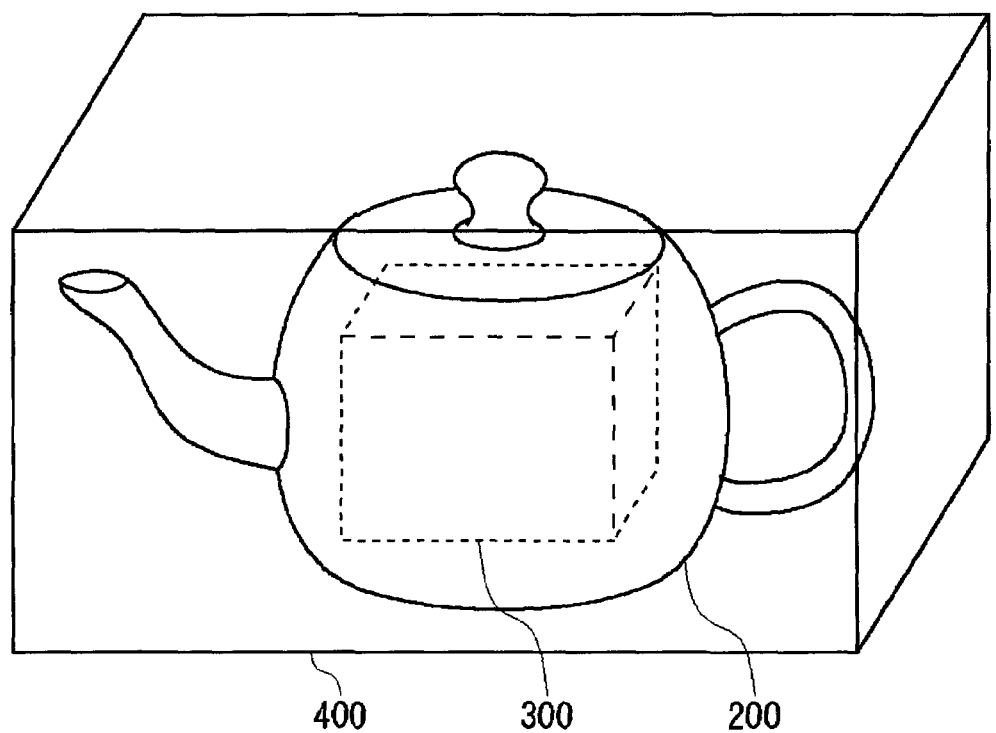
FIG. 1B illustrates an external volume and an internal volume provided for the object.

FIG. 1A illustrates an object 200 given as a rendering target. FIG. 1B illustrates an external volume 400 and an internal volume 300 provided for the object 200. The external volume 400 is formed so as to entirely include the object 200 therein. The internal volume 300 is formed so as to be entirely included inside the object 200.

For example, the external volume 400 is a rectangular solid having the minimum size required to entirely include the object 200. The internal volume 300 is a rectangular solid having the maximum size required to be entirely included inside the object 200. Alternatively, the external volume 400 and the internal volume 300 may be a solid body having a shape other than a rectangular solid, such as a sphere. The external volume 400 and the internal volume 300 may be a closed space that is surrounded by polygons each having an external volume attribute and an internal volume attribute, respectively.

The external volume 400 may also be referred to as an "inclusion volume" since it includes the object 200 within its inside. The internal volume 300 may also be referred to as an "exclusion volume" since it excludes the surfaces of the object 200 to its outside. The external volume 400 delimits from outside the space for the object 200 to occupy, while the internal volume 300 delimits from inside the space for the object 200 to occupy. In that sense, the external volume 400 and the internal volume 300 can be regarded as "double bounding volumes" which define the shape of the object 200 from both outside and inside.

The external volume 400 is used when consulting the reduced Z-buffer and performing a Z test to determine if the object 200 included therein has the possibility of being rendered, i.e., whether or not to exclude (cull out) the object from rendering targets. The external volume 400 is not used to update Z values of the reduced Z-buffer. On the other hand, the internal volume 300 is used to update representative Z values in the reduced Z-buffer but not for the culling test on the object 200.

The external volume 400 and the internal volume 300 may have any shapes and any complexities as long as they are capable being rasterized. These two bounding volumes are provided for reducing the number of polygons of the object 200 so as to reduce a required memory capacity and to accelerate the Z culling test and the updating of the reduced Z-buffer. As described later, there is a guarantee that the object 200 will not be erroneously culled out even though the Z culling is performed based on the external volume 400 while the representative Z values of the reduced Z-buffer is being updated based on the internal volume 300.

It should be noted that either one or both of the external volume 400 and the internal volume 300 can be equal to the object 200. That is, the Z culling test and/or the updating of the reduced Z-buffer may be performed by simply using the surficial shape of the object 200 as the external volume 400 and/or the internal volume 300. In this case, since the external and/or internal volumes have the same shape as the object 200 with a greater number of polygons, there will be an increase in both the memory capacity and the amount of calculation. However, it can increase accuracy in determining and culling out more objects that have no possibility of being rendered.

The closer to the shape of object 200 the external volume 400 and/or the internal volume 300 are formed, the greater the number of objects that can be culled out becomes. However, the required amount of memory and calculation will increase. On the other hand, the simpler the shape of the external volume 400 and/or the internal volume 300, the less the amount of memory and calculation. However, the number of objects that can be culled out will decrease. There is thus a tradeoff between the number of objects that can be culled out and the amount of memory and calculation required. Therefore the shape of the external volume 400 and/or the internal volume 300 will be determined appropriately in consideration of the balance between culling efficiency and limitations in the memory capacity and the processing performance of the computer.

Figure 2:
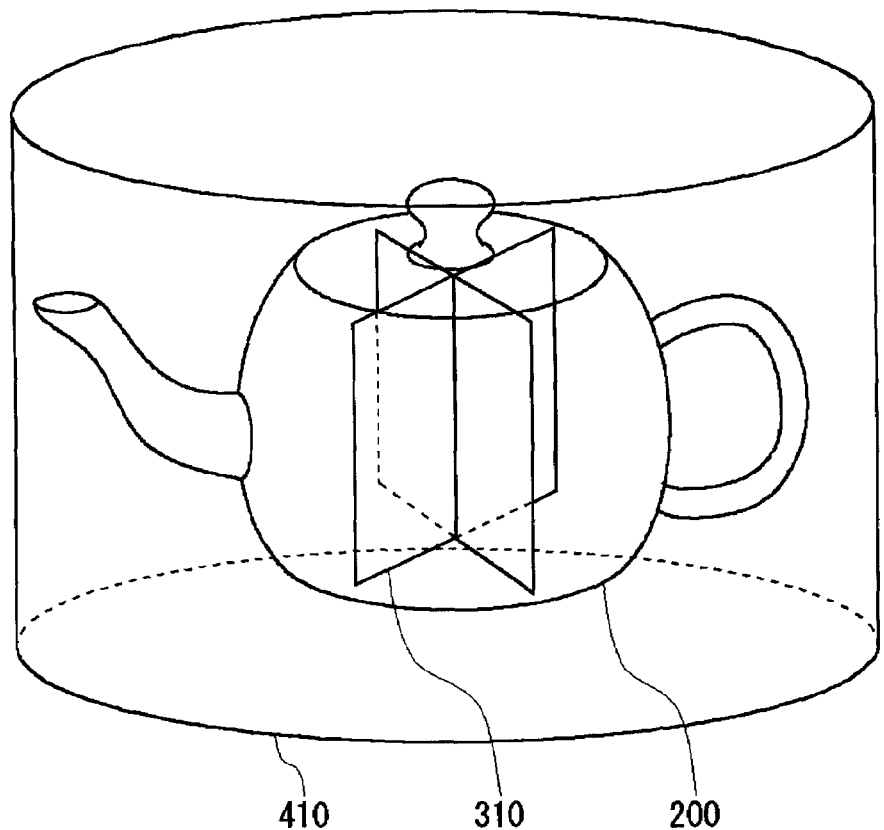
FIG. 2 illustrates another example of an external volume and an internal volume provided for an object.

FIG. 2 illustrates the external volume 410 and the internal volume 310 provided for the object 200, as another example. The external volume 410 is a cylinder which includes the object 200 therein. The internal volume 310 is composed of two orthogonal plates which are included inside the object 200. The internal volume 310 need not be an object having solid contents, but may be made of plates such as these having no thickness. For the sake of convenience, the term "volume" will still be used even for the plates having no thickness.

The internal volume 310 has two plates in a cross-like shape when viewed from above. However, it may be made of three or more plates, or a single plate in some cases. In the case of a single plate, however, the internal volume 310 may look thinner or even disappear completely depending on the point of view. After projection transformation, the area occupied by the internal volume 310 might therefore shrink so that the reduced Z-buffer cannot be adequately updated. However, when two plates are crossed each other, it prevents the internal volume 310 from disappearing depending on the point of view, and reduces the amount of calculation as compared to when three or more plates are used. The internal volume 310 is thus more preferably composed of two orthogonal plates.

[2] Z Test

The external volume 400 and the internal volume 300, provided for the object 200, are each composed of polygons. These polygons are projected onto screen coordinates where the object 200 is rendered, followed by rasterization processing corresponding to the reduced Z-buffer. The rasterization of the external volume 400 involves a Z culling test using the reduced Z-buffer. The rasterization of the internal volume 300 involves updating the representative Z values of the reduced Z-buffer.

[2.1] Reduced Z-Buffer

Figure 3:
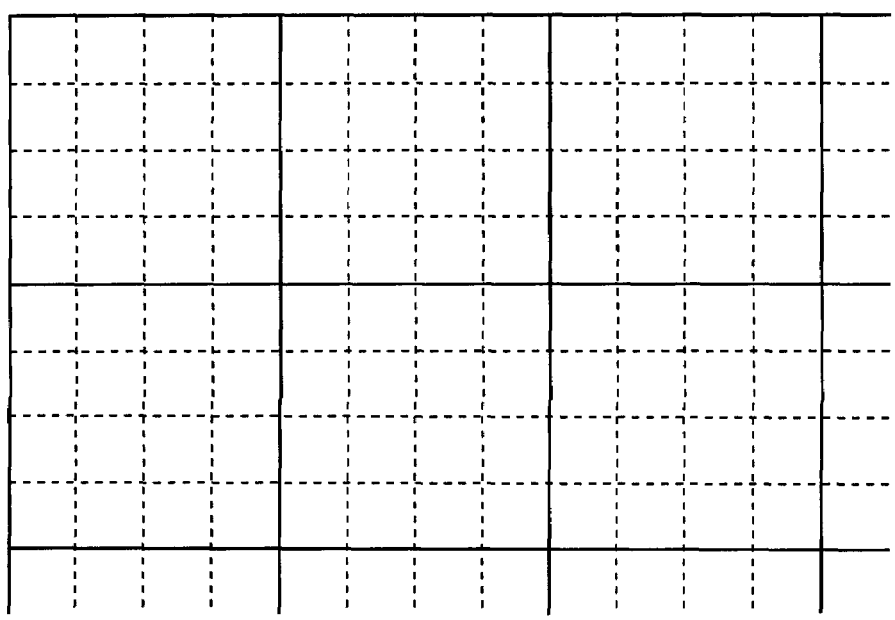
FIG. 3 shows a reduced Z-buffer.

FIG. 3 shows a reduced Z-buffer 500. The reduced Z-buffer 500 is a buffer of reduced resolution, having pixel blocks where a plurality of pixels given in a tile shape in the Z-buffer used for rendering are grouped. Since the two bounding volumes, or the external volume 400 and the internal volume 300, are rasterized in association with the reduced Z-buffer 500, it is possible to perform hidden surface removal with a less amount of processing.

In the example of FIG. 3, the reduced Z-buffer 500 stores Z values in units of pixel blocks each having a 4 by 4 matrix of pixels. In the diagram, the minimum pixels are bordered by dotted lines, and the pixel blocks by solid lines. One pixel block includes 16 pixels. The per-pixel-block Z value is referred to as a "representative Z value." The Z value herein indicates depth as seen from the point of view. The Z value decreases in a direction of approaching toward the point of view and increases in a direction of leaving away from the point of view.

The representative Z value of each pixel block in the reduced Z-buffer 500 is determined according to the following three types of per-pixel Z values: the Z values of pixels at the vertexes of polygons of the internal volume 300 that are rendered in this pixel block; the Z values of pixels at intersections between the edges of those polygons and the borders of this pixel block; and the Z values of pixels at four corners of this pixel block. It is ensured that the representative Z value of each pixel block is the largest value among the per-pixel Z values in the pixel block, i.e., the Z value of the pixel that is farthest from the point of view. The method for updating the representative Z values in the reduced Z-buffer 500 will be described later.

[2.2] Z Culling Test Using the Reduced Z-Buffer Based on the External Volume

The external volume 400 is provided for detecting areas where the object 200 has the possibility of being rendered, and for determining whether or not to cull out the object 200. The object 200 must not be culled out if there is any area where the possibility of being rendered cannot be denied. To guarantee that there is no area missed in the culling test, the external volume 400 has to include the object 200 entirely. Even when the external volume 400 has any redundant area that is not spatially occupied by the object 200, the culling test can be performed without any failure, although the processing efficiency may drop.

In the rasterization process of the external volume 400, a Z culling test is made as follows. It is determined that the object 200 has a possibility of being rendered if it turns out that at least one of pixel blocks of the external volume 400 to be rendered has any one per-pixel Z value that is smaller than the representative Z value of the corresponding pixel block in the reduced Z-buffer 500. Conversely, the object 200 is culled out if the smallest per-pixel Z value within every pixel block of the external volume to be rendered is greater than the representative Z value of corresponding pixel block in the reduced Z-buffer.

For each pixel block, the Z value of the closest pixel is thus compared with the representative Z value of the reduced Z-buffer 500 so that it can be reliably determined that the object 200 having a possibility of being rendered is a rendering target. Therefore there is a guarantee that any object 200 that has a possibility of being rendered never be erroneously culled out. The rasterization process of the external volume 400 involves the Z culling test alone. In other words, the representative Z values of the reduced Z-buffer 500 are referred to and compared with the per-pixel Z values, however, no representative Z value will be written to the reduced Z-buffer 500. Hereinafter, the procedure of the Z culling test will now be described with reference to some concrete examples.

Figure 4:
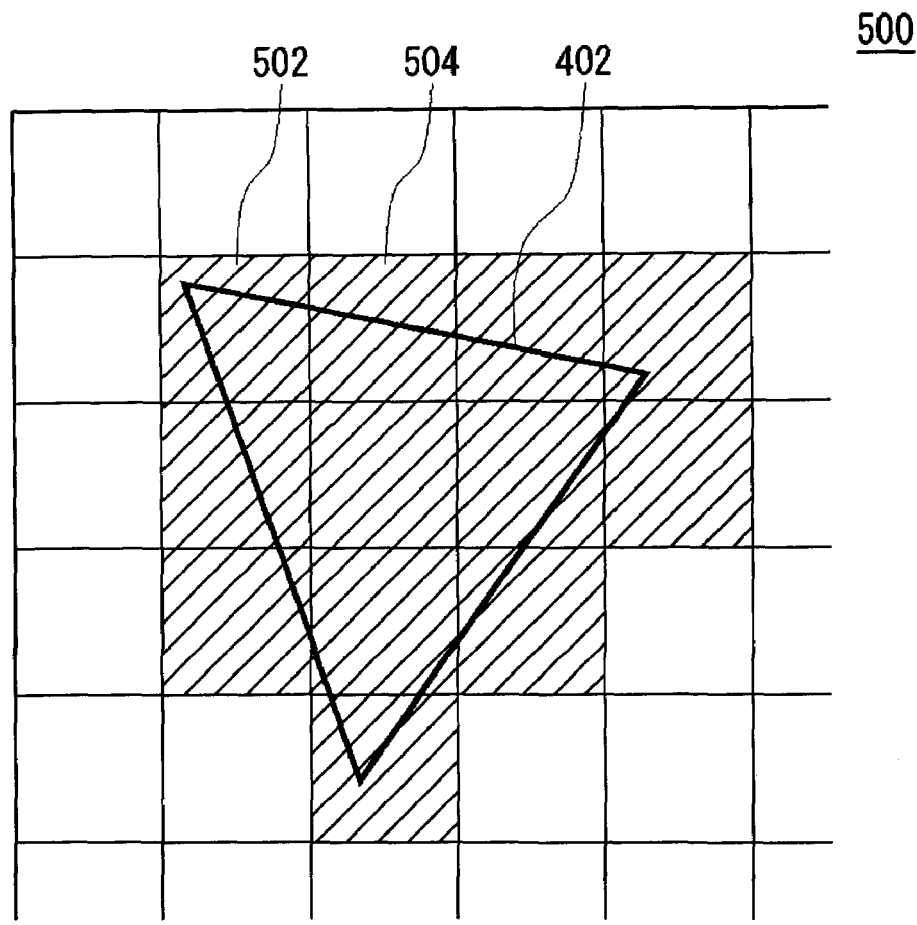
FIG. 4 shows the relationship between a polygon of an external volume of an object and a reduced Z-buffer.

FIG. 4 shows the relationship between a polygon 402 of the external volume 400 of the object 200 and the reduced Z-buffer 500. The figure shows the polygon 402 projected onto the drawing plane. The polygon 402 will be rendered in the pixel blocks (reference numerals 502, 504 and so on) shown shaded in the reduced Z-buffer 500. The polygon 402 is rasterized and the Z values of the pixels are calculated. Then the per-pixel Z values are compared with the representative Z value of the corresponding pixel block for Z test.

Figure 5:
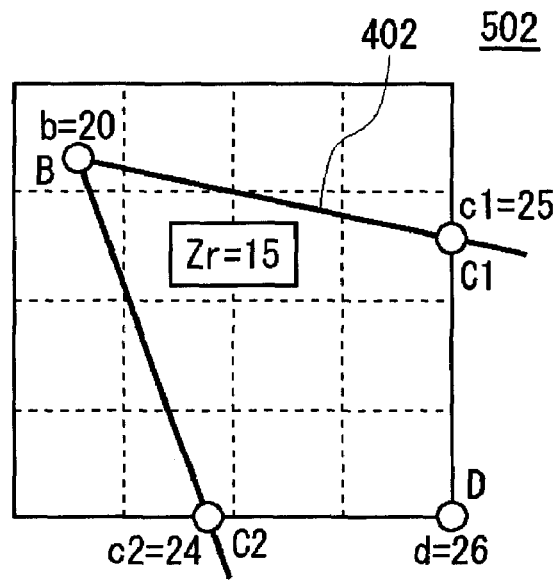
FIG. 5 shows the relationship between a representative Z value and per-pixel Z values in a pixel block of the reduced Z-buffer of FIG. 4.

FIG. 5 shows the relationship between the representative Z value and the per-pixel Z values in the pixel block 502 of the reduced Z-buffer 500 of FIG. 4. The pixel block 502 has a representative Z value of $Zr=15$. The vertex B of the polygon 402 has a Z value of $b=20$. The intersections C1 and C2 between the edges of the polygon 402 and the borders of the pixel block 502 have Z values of $c1=25$ and $c2=24$, respectively. Among the four corners of the pixel block 502, the point D that falls within the polygon 402 has a Z value of $d=26$.

In the case of FIG. 5, the pixels in the pixel block 502, obtained by rasterizing the polygon 402, have Z values greater than the representative Z value of this pixel block 502 in the reduced Z-buffer 500. It is therefore certain that the polygon 402 lies behind the reduced Z-buffer 500 as far as the pixel block 502 is concerned. This is because the pixel block 502 of the reduced Z-buffer 500 has the representative Z value of $Zr=15$, and it is ensured by the definition of the reduced Z-buffer 500 that this representative Z value is the largest among the Z values of the pixel block 502 when it is viewed in a unit of the minimum pixel. Since the Z values of the minimum pixels of the pixel block 502 do not exceed 15, it is clear that the points B, C1, C2, and D on the polygon 402, sampled within the pixel block 502, definitely lie behind.

The Z test is performed on every pixel block shown shaded in FIG. 4 where the polygon 402 is to be rendered. If for the every pixel block the Z values of the rasterized pixels are greater than the representative Z value of the reduced Z-buffer 500, it turns out that the polygon 402 must be subject to hidden surface removal. The Z test is performed on all the polygons of the external volume 400 to be rendered, and if it turns out that all the polygons must be subject to hidden surface removal, then it is finally determined that the external volume 400 is invisible from the point of view. In this case, the object 200 included inside the external volume 400 is culled out.

Figures 6A, 6B, 6C:
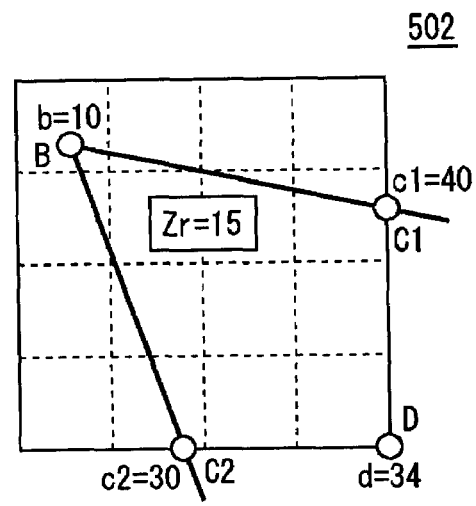
FIG. 6A shows another example of the relationship between a representative Z value and the per-pixel Z values in a pixel block of the reduced Z-buffer of FIG. 4.
FIGS. 6B and 6C show examples of pixel-by-pixel distribution of Z values in the pixel block of FIG. 6A.

FIG. 6A shows another example of the relationship between the representative Z value and the per-pixel Z values in the pixel block 502 of the reduced Z-buffer 400 of FIG. 4. In this example, the pixel block 502 has a representative Z value of $Zr=15$. The vertex B of the polygon 402 has a Z value of $b=10$. The intersections C1 and C2 between the edge of the polygon 402 and the borders of the pixel block 502 have Z values of $c1=40$ and $c2=30$, respectively. The corner D of the pixel block 502 inside the polygon 402 has a Z value of $d=34$.

In the case of FIG. 6A, the Z value b at the vertex B is smaller than the representative Z value ($Zr=15$) of the pixel block 502 of the reduced Z-buffer 500. The Z values c1 and c2 at the intersections C1 and C2 and the Z value d at the corner D of the pixel block 502 in the polygon 402 are greater than the representative Z value of the pixel block 502. Here, it is uncertain whether or not the polygon 402 lies in front or behind at the pixel block 502 unless the Z values are compared in a unit of the minimum pixel. FIGS. 6B and 6C show examples of pixel-by-pixel distribution of Z values in the pixel block 502. With the reference to FIGS. 6B and 6C, it will be now determined for the respective pixel-by-pixel distribution whether or not the polygon 402 lies in front or behind at the pixel block 502.

FIG. 6B shows an example of distribution of the per-pixel Z values in the pixel block 502. The vertex B has a Z value of $b=10$ that is greater than the per-pixel Z value or 8 in the same position. The vertex B thus lies behind. In this case, the vertex B, the intersections C1 and C2, and the corner D are all positioned behind. It turned out that this polygon 402 lies behind as far as the pixel block 502 is concerned.

FIG. 6C shows another example of distribution of the per-pixel Z values in the pixel block 502. The vertex B has a Z value of $b=10$ that is smaller than the per-pixel Z value or 15 in the same position. The vertex B thus lies in front. Since at least the vertex B of the polygon 402 lies in front, the polygon 402 must be determined to be a rendering target and the object 200 must not be culled out.

According to the discussion referring to FIG. 5 and FIGS. 6A to 6C, the following can be understood. It must be determined based on a relaxed criterion such as "when in doubt, render it" whether or not the polygon 402 has a possibility of being rendered. On the other hand, it must be determined based on a rigid criterion such as "when in doubt, do not cull it out" whether or not to exclude the polygon 402 from rendering targets and cull it out.

In order to guarantee that any object having a possibility of being rendered is not erroneously culled out, a rigid culling criterion is defined as follows.

[Rigid Culling Criterion B]

For every pixel block where the external volume 400 is to be rendered, cull out the object 200 only if all the rasterized pixels to be rendered within the pixel block have Z values greater than the representative Z value of that pixel block of the reduced Z-buffer 500, or equivalently, cull out the object 200 if the smallest value among the Z values of the rasterized pixels to be rendered within the pixel block is greater than the representative Z value of that pixel block of the reduced Z-buffer 500.

When comparing the per-pixel Z values within the pixel block 502 where the polygon 402 of the external volume 400 is to be rendered and the representative Z value of the pixel block 502 of the reduced Z-buffer 500, it is unnecessary to compare every pixel obtained from the rasterized polygon 402 with the representative Z value of the pixel block 502. Instead, it will be sufficient to only evaluate the Z values at the endpoints of the polygon 402 since the polygon 402 is a two-dimensional surface. More specifically, as described with reference to FIGS. 5 and 6A, what must be compared with the representative Z value Zr of the pixel block 502 are the following three types of Z values: the Z value b of the pixel at the vertex B of the polygon 402 of the external volume 400 falling within the pixel block 502; the Z values c1 and c2 of the pixels at the intersections C1 and C2 between the edges of the polygon 402 and the borders of the pixel block 502; and the Z value d of the pixel at the corner D of the pixel block 502 inside the polygon 402. Consequently, the rigid culling criterion B can be simplified as follows.

[Rigid Culling Criterion B']

For every pixel block where the external volume 400 is to be rendered, cull out the object 200 if b>Zr and c>Zr and d>Zr, or equivalently, cull out the object 200 if min(b, c, d)>Zr. Here, b is the Z value at a vertex B of the polygon of the external volume 400 falling within the pixel block, c is the Z value at an intersection C between an edge of the polygon and a border of the pixel block, and d is the Z value at a corner D of the pixel block inside this polygon. If there are plural vertexes B, intersections C, or corners D, all the sampling points are subject to the evaluation.

The rigid culling criterion B' is such that for every pixel block where the external volume 400 is to be rendered, the object is culled out only if the nearest point among vertexes B, intersections C, and corners D lies behind the position indicated by the representative Z value Zr of the reduced Z-buffer 500. By the definition of the reduced Z-buffer 500, none of the Z values in a unit of the minimum pixel exceeds the representative Z value Zr of the reduced Z-buffer 500. It is guaranteed that any object to be rendered will not be erroneously culled out as long as culling is performed based on this criterion.

The logical negation of the rigid culling criterion B provides a relaxed rendering criterion that is "when in doubt, render it" as follows.

[Relaxed Rendering Criterion A]

It is determined that the object 200 has a possibility of being rendered if it turns out that at least one of pixel blocks where the external volume 400 is to be rendered has any one per-pixel Z value that is smaller than the representative Z value of that pixel block of the reduction Z-buffer 500.

Since the polygon 402 of the external volume 400 is a two-dimensional plane, the relaxed rendering criterion A can be simplified as follows.

[Relaxed Rendering Criterion A']

For at least one of pixel blocks where the external volume 400 is to be rendered, it is determined that the object 200 has a possibility of being rendered if b<Zr or c<Zr or d<Zr. Here, b is the Z value at a vertex B of the polygon of the external volume 400 falling within the pixel block, c is the Z value at an intersection C between an edge of the polygon and a border of the pixel block, and d is the Z value at a corner D of the pixel block inside this polygon. If there are plural vertexes B, intersections C, or corners D, all the sampling points are subject to the evaluation.

Once the relaxed rendering criterion A' holds for any one pixel block in the process of rasterizing the external volume 400 of the object 200 for Z test, then it is immediately determined that the object 200 has a possibility of being rendered and the Z culling test proceeds to the next object for the sake of accelerating the process. If the relaxed rendering criterion A' does not hold for any of the pixel blocks where the external volume 400 of the object 200 is to be rendered, then the rigid culling condition B' holds consequently and the object 200 is culled out.

Figure 7:
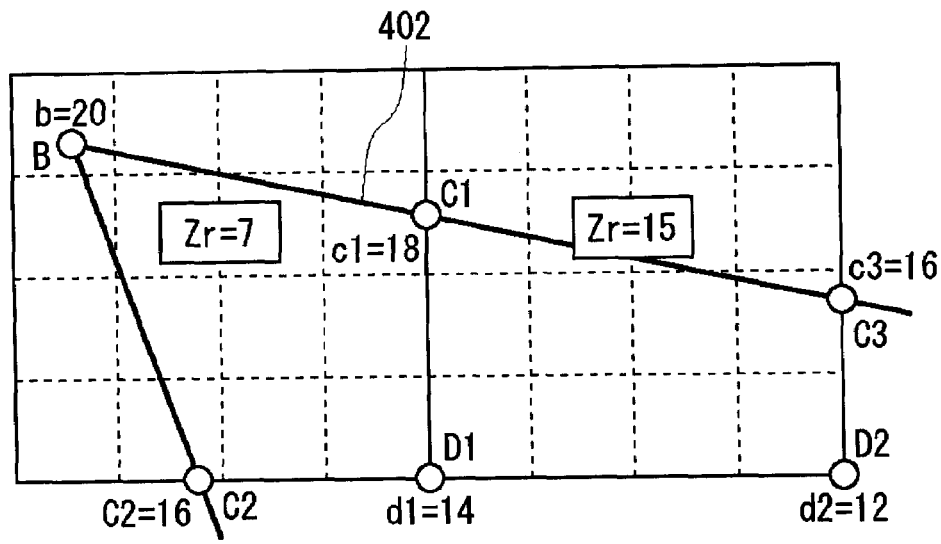
FIG. 7 explains how rasterization process and Z test is performed on two pixel blocks of the reduced Z-buffer of FIG. 4 in sequence.

FIG. 7 explains how rasterization process and Z test is performed on the two pixel blocks 502 and 504 of the reduced Z-buffer 500 of FIG. 4 in sequence. First, the left pixel block 502 of the reduced Z-buffer 500 is rasterized. The vertex B of the polygon 402 has a Z value of b=20. The intersections C1 and C2 have Z values of c1=18 and c2=16, respectively. The corner D1 has a Z value of d1=14. The left pixel block 502 has a representative Z value of Zr=7. In the left pixel block 502, all the sampling points B, C1, C2, and D1 inside the polygon 402 have Z values greater than the representative Z value and thus lie behind. At the stage of rasterizing the left pixel block 502, it is therefore not yet determined that the object 200 has a possibility of being rendered.

Next, the rasterization processing proceeds to the right pixel block 504. In the right pixel block 504, the intersections C1 and C3 of the polygon 402 have Z values of c1=18 and c3=16, respectively. The corners D1 and D2 have Z values of d1=14 and d2=12. The right pixel block 504 has a representative Z value of Zr=15. At the intersections C1 and C3, c1>Zr and c3>Zr. At the corners D1 and D2, d1<Zr and d2<Zr, which satisfies the relaxed rendering criterion A'. It is thus determined that the object 200 has a possibility of being rendered, and the subsequent rasterization process on the external volume 400 is aborted.

As described above, the external volume 400 is rasterized along scan lines while the rendering determination test is performed on each pixel block. Once it turns out that the relaxed rendering criterion A' holds for any one pixel block, the object 200 is determined to have a possibility of being rendered and the subsequent rasterization process is aborted. If it turns out that the relaxed rendering criterion A' does not hold for any of the pixel blocks, i.e., the rigid culling criterion B' holds, the object 200 is culled out.

Figure 8:
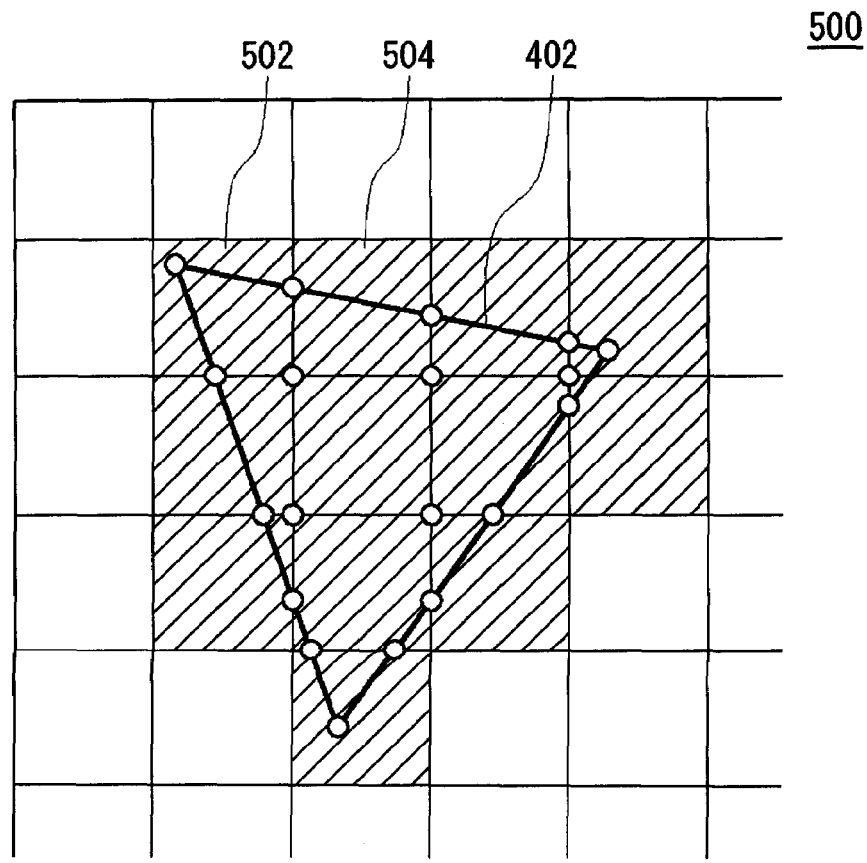
FIG. 8 shows sampling points on which Z test is performed in the process of rasterizing a polygon of an external volume.

FIG. 8 shows sampling points on which Z test is performed in the process of rasterizing the polygon 402 of the external volume 400. Since the Z test is performed on the vertexes, intersections, and corners included in the shaded pixel blocks inside the polygon 402 of the external volume 400, the sampling points are those marked with the white circles. For the sampling points on a border between pixel blocks, the Z test will be performed using the representative Z values of all the pixel blocks that adjoin each other across the border.

[2.3] Updating Representative Z Values of the Reduced Z-Buffer Based on the Internal Volume The internal volume 300 is provided for detecting hidden and non-rendered areas of the other objects that lie behind the object 200, and for updating the reduced Z-buffer 500. To detect non-rendered areas accurately, all the following requirements must be satisfied.

1. All the rasterized pixels within pixel blocks of the internal volume 300 to be rendered must be covered by the rendering data of the internal volume 300. Here, the pixel block needs not be covered by only a single polygon of the internal volume 300 but may be covered by a plurality of polygons. If there is any spatial gap in the pixel block, the other objects may be seen through the gap. In such cases, the representative Z value cannot be updated with the Z values of the internal volume 300.

2. Select one pixel having the largest Z value from among all the rasterized pixels in a pixel block of the internal volume 300 to be rendered, and update the representative Z value of that pixel block with the largest per-pixel Z value in the pixel block.

For the foregoing requirement 1, it is difficult to determine whether or not there is any spatial gap in the pixel block when it is viewed in a unit of pixel, since the reduced Z-buffer 500 contains Z values only in a unit of pixel block in which a plurality of pixels are put together. The Z test according to the present embodiment is intended to make the hidden surface removal process more efficient, and the object may therefore be determined to be a rendering target in any case where the Z test is difficult to perform. In view of this, the representative Z values of pixel blocks will be updated only if the internal volume 300 is rendered across all the pixels within those pixel blocks of the reduced Z-buffer 500. For this purpose, whether or not all the pixels within a pixel block of the reduced Z-buffer 500 are covered by a plurality of polygons is determined by the following determination procedure.

(1) Provide each edge of each polygon that constitutes the internal volume 300 with a determination flag that takes a value of 0 or 1. Initialize the determination flags on the respective edges to 0.

(2) Find a terminal edge of the internal volume 300, and set the determination flag on the terminal edge to 1. This process is performed by determining whether or not each edge of each polygon of the internal volume 300 has any adjoining polygon, thereby detecting an edge that has no other polygon adjoining thereto. The edge having no other polygons adjoining thereto is a terminal end, and the determination flag on the terminal edge is set to 1. This process can be performed at the stage of producing the internal volume 300.

It should be noted that if the internal volume 300 is a solid 3-dimensional body, there is no terminal edge that has no other polygon adjoining thereto and therefore the processing (2) of detecting terminal edges can be omitted. If the internal volume 300 has a plate-like shape, there are some terminal edges that have no other polygon adjoining thereto and therefore the processing (2) of detecting terminal edges is required.

(3) Next, find an edge that forms a border when the internal volume 300 is projected onto the screen coordinates for rendering, and set the determination flag of the edge to 1. This process is performed by obtaining the normal vector of each of the polygons of the internal volume 300 when projecting the polygon onto the screen coordinates, and detecting an edge across which the normal vector of the polygon changes from a direction passing through the projection plane from the back to the front to a direction passing through the projection plane from the front to the back. A forward polygon that can be seen from the point of view has a normal vector in the direction passing through the projection plane from the back to the front. A rearward polygon that cannot be seen from the point of view has a normal vector in the direction passing through the projection plane from the front to the back. Consequently, the edge of the polygon that forms a border when the internal volume 300 is rendered can be detected according to the change in the direction of the normal vector. The determination flag on the edge that are detected as a border is set to 1.

(4) The pixel blocks of the reduced Z buffer 500 that the edges pass through, which are detected to have the determination flag of 1 in the foregoing processing (2) and (3), can possibly have spatial gaps therein, because all the pixels in those pixel blocks are not necessarily rendered. Therefore, the pixel block that includes at least one edge having the determination flag of 1 is excluded from the target for updating of the representative Z values. The pixel block that only edges having the determination flag of 0 pass through is then subject to the updating of the representative Z values.

Figure 9:
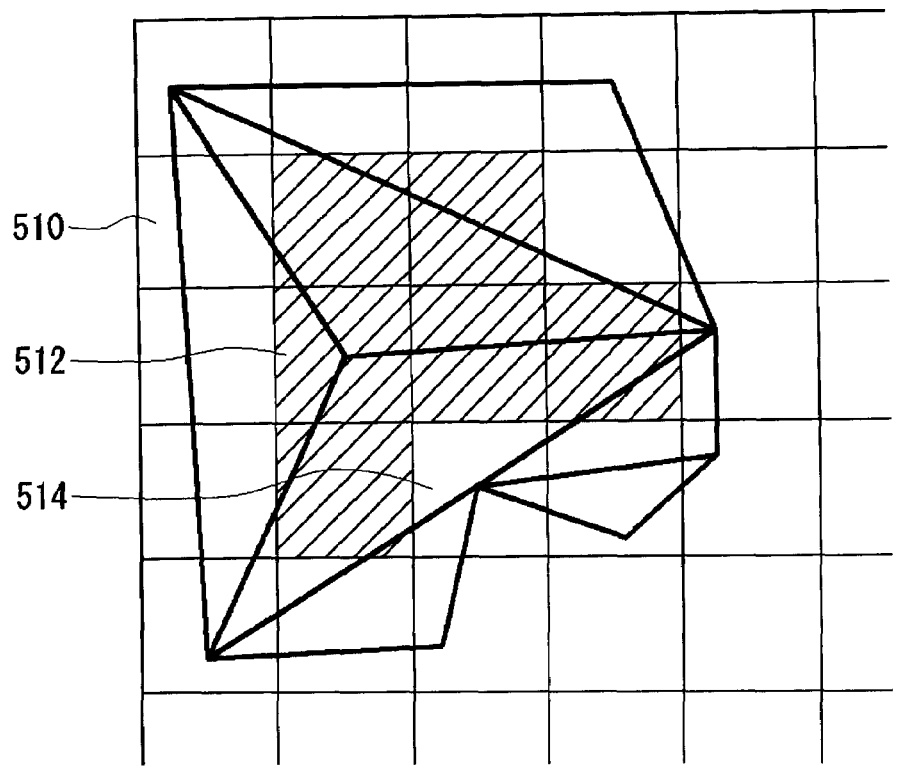
FIG. 9 shows the relationship between polygons of a projected internal volume and a reduced Z-buffer.

Referring to FIGS. 9, 10, and 11A to 11C, a description will be given of the foregoing determination procedure (1) to (4). FIG. 9 shows the relationship between projected polygons of the internal volume 300 and the reduced Z-buffer 500. Among the pixel blocks of the reduced Z-buffer 500 that the edges of the polygons of the internal volume 300 pass through, the shaded pixel blocks alone are subject to the updating of the representative Z values. This will be described with reference to FIGS. 10 and 11A to 11C.

Figure 10:
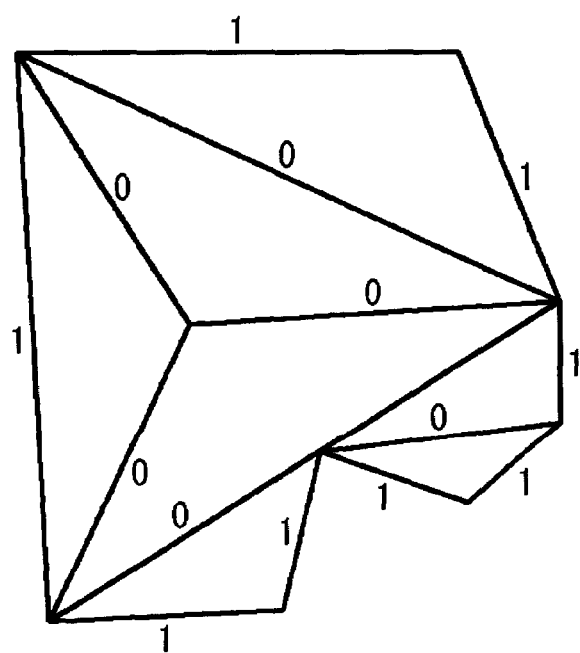
FIG. 10 shows the values of determination flags set on the respective edges of the polygons of the internal volume shown in FIG. 9.
Figure 11A:
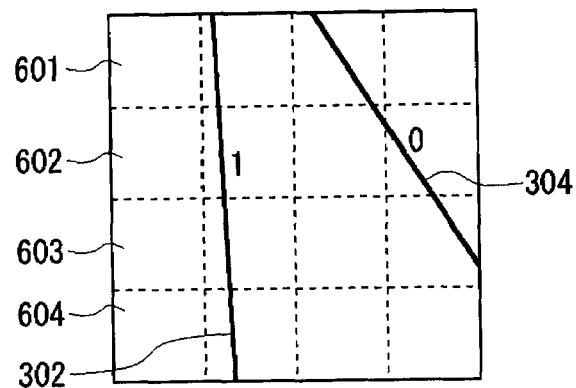
FIGS. 11A to 11C show polygon edges that pass through three pixel blocks of the reduced Z-buffer of FIG. 9, along with the values of their determination flags of FIG. 10.
Figure 11B:
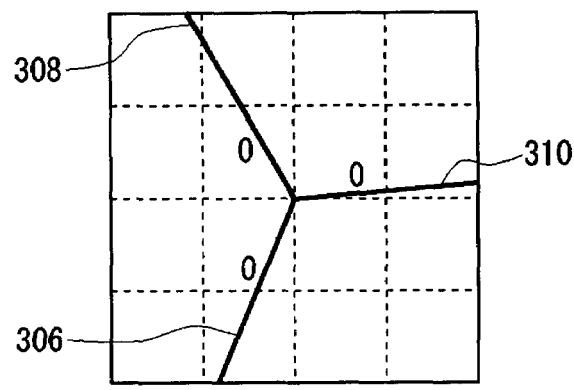
Figure 11C:
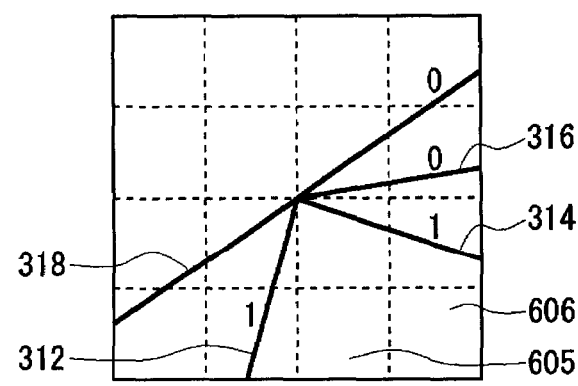

FIG. 10 shows the values of the determination flags that are set on the respective edges of the polygons of the internal volume 300 shown in FIG. 9. The edges having the determination flags of 1 are the borders of the internal volume 300. FIGS. 11A to 11C shows polygon edges that pass through the pixel blocks 510, 512, and 514 of the reduced Z-buffer 500 of FIG. 9, along with the values of the determination flags of FIG. 10.

As shown in FIG. 11A, an edge 302 having a determination flag of 1 and an edge 304 having a determination flag of 0 pass through the pixel block 510. Since the edge 302 having the determination flag of 1 is a border, four pixels 601, 602, 603, and 604 in the pixel block 510 are not involved in polygon rendering. This produces a spatial gap such that the other objects behind can possibly be seen. Thus, the representative Z value of this pixel block 510 will not be updated.

As shown in FIG. 11B, three edges 306, 308, and 310 having the determination flags of 0 pass through the pixel block 512. Since all the pixels of the pixel block 512 are entirely covered with three polygons, there is no spatial gap. The representative Z value of this pixel block 512 will therefore be subject to updating.

As shown in FIG. 11C, two edges 316 and 318 having the determination flag of 0 and two edges 312 and 314 having the determination flag of 1 pass through the pixel block 514. Since two pixels 605 and 606 are not involved in polygon rendering, there arises a spatial gap such that the other objects behind can possibly be seen. Therefore, the representative Z value of this pixel block 514 will not be updated.

As described above, the determination flags on the respective edges of the polygons shown in FIG. 10 are consulted to identify for which pixel blocks the representative Z values should be updated. FIG. 9 shows the result in which only the pixel blocks shown shaded are subject to the updating of the representative Z values. A description will now be given of the method for updating the representative Z values.

[Z Value Updating Condition C]

For a pixel block of the reduced Z-buffer 500 that is entirely covered by the internal volume 300, update the representative Z value of the pixel block with the largest per-pixel Z value within the pixel block if all the rasterized pixels within the pixel block of the internal volume 300 to be rendered have the Z value smaller than the representative Z value of that pixel block of the reduced Z-buffer 500, or equivalently, update the representative Z value of the pixel block with the largest per-pixel Z value within that pixel block if the largest per-pixel Z value within the pixel block of the internal volume 300 to be rendered is smaller than the representative Z value of that pixel block of the reduced Z-buffer 500.

Since the internal volume 300 has flat polygon surfaces, the representative Z value Zr of the reduced Z-buffer 500 has only to be compared with the following three types of Z values: the Z value of a pixel at a polygon vertex B; the Z value of a pixel at an intersection C between an edge of the polygon and a border of the pixel block; and the Z values of pixels at the four corners D1 to D4 of the pixel block. Consequently, the Z value updating condition C can be simplified as follows.

[Z Value Updating Condition C']

For a pixel block of the reduced Z-buffer 500 that is entirely covered by the internal volume 300, update the Z value of the reduced Z-buffer with the value of max(b, c, d1, d2, d3, d4) if max(b, c, d1, d2, d3, d4)<Zr. Here, b is the Z value at a polygon vertex B of the internal volume 300 that falls within the pixel block, c is the Z value at an intersection C between an edge of the polygon and a border of the pixel block, and d1 to d4 are the Z values at the four corners D1 to D4 of the pixel block. If there are plural vertexes B or intersections C, all the sampling points are subjected to the evaluation.

This Z value updating condition C' is intended to update the current representative Z value Zr of the reduced Z-buffer with the Z value of the farthest point among the vertex(es) B, the intersection(s) C, and the four corners D1 to D4 if the farthest point lies closer than the representative Z value Zr. The representative Z value is updated only when it is certain that the polygon lies in front, and not updated when in doubt. When the reduced Z-buffer 500 having the representative Z values thus updated is consulted to perform the Z culling test, it is guaranteed that any object having a possibility of being rendered will never be erroneously culled out.

Figure 12:
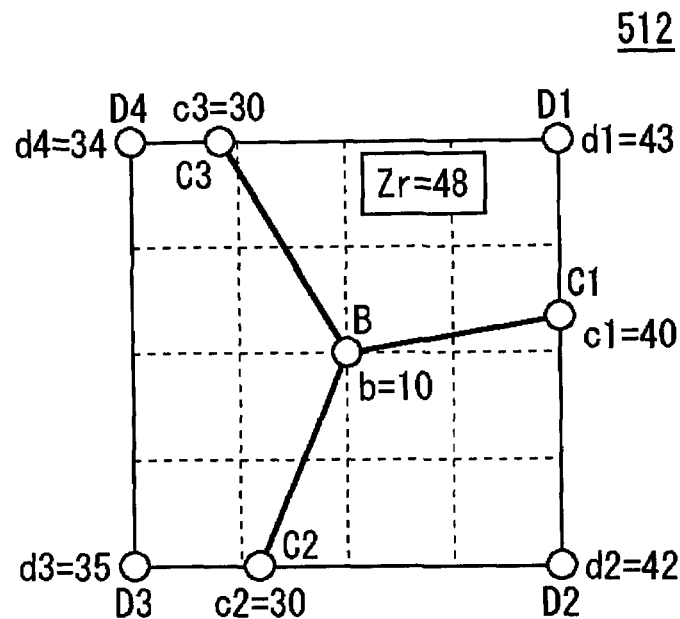
FIG. 12 explains how a representative Z value of a pixel block of a reduced Z-buffer is updated.

FIG. 12 explains how the representative Z value of the pixel block 512 of the reduced Z-buffer 500 is updated. The pixel block 512 is entirely covered with the polygons of the internal volume 300, and it is thus subject to updating of the representative Z value. The vertex B of the polygon 402 has a Z value of b=10. The intersections C1 to C3 have Z values of c1=40, C2=30, and c3=30, respectively. The four corner points D1 to D4 have Z values of d1=43, d2=42, d3=35, and d4=34, respectively. Since the pixel block 512 has a representative Z value of Zr=48, the Z value updating condition C' is satisfied. The representative Z value Zr is updated with the largest Z value of d1=43 that is the Z value at the corner D1.

Figure 13:
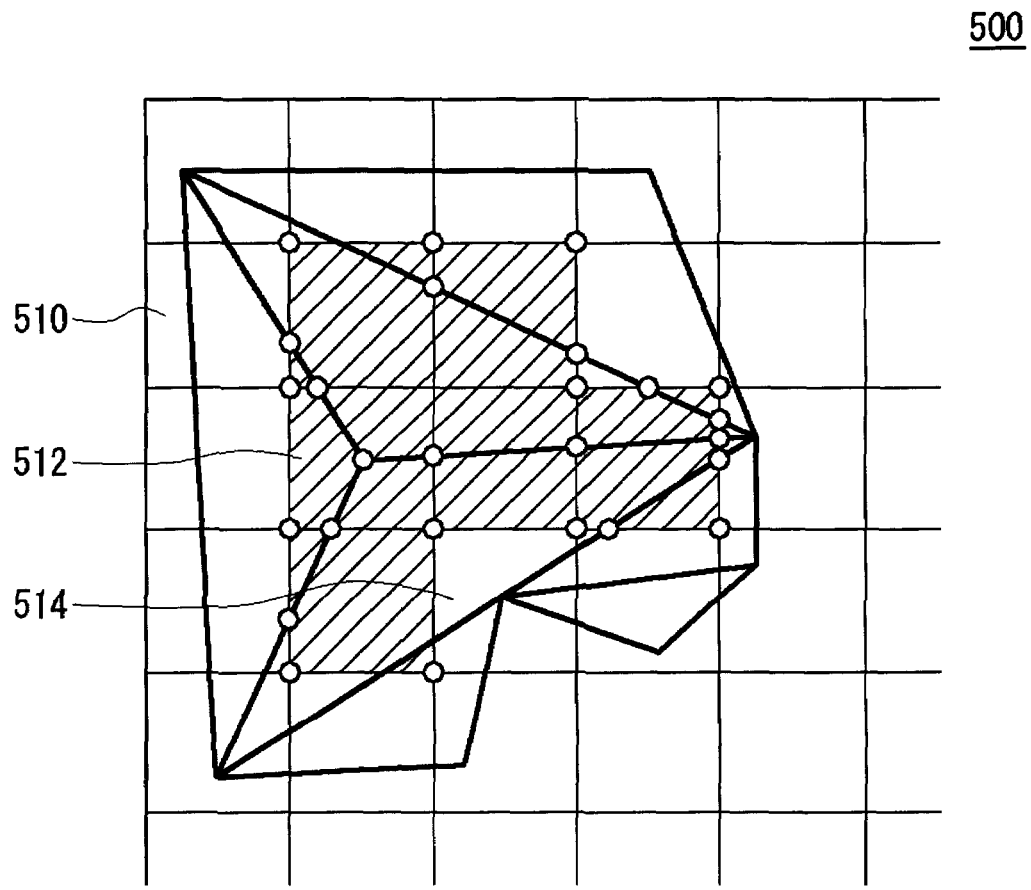
FIG. 13 shows sampling points subject to a Z test in rasterizing the polygons of the internal volume.

FIG. 13 shows sampling points subject to the Z test in rasterizing the polygons of the internal volume 300. In the shaded pixel blocks for which the representative Z values are targeted for updating, the Z values of the sampling points shown by white circles are compared with the representative Z values of the respective pixel blocks. If the Z value updating condition C' is satisfied, the representative Z value of that pixel block is updated.

[3] Advantages and Modification of the Embodiment

According to the present embodiment as described, the object 200 is provided with the external volume 400 and the internal volume 300 and different types of Z tests are performed on the respective volumes using the reduced Z-buffer 500. This makes it possible to cull out the object 200 that has no possibility of being rendered, thereby enhancing the efficiency of the hidden surface removal processing.

In addition, the object 200 is sandwiched between the external volume 400 and the internal volume 300, or double bounding volumes. The accuracy with which the double bounding volumes approximate the shape of the object 200 can be adjusted to arbitrarily change the culling efficiency as appropriate.

The conventional methods for generating the reduced Z-buffer includes obtaining an ordinary pixel-by-pixel Z-buffer, and putting together the Z values of a plurality of pixels stepwise so as to generate a hierarchical Z-buffer having resolutions reduced stepwise. According to the present embodiment, however, the reduced Z-buffer in units of pixel blocks can be directly obtained with high processing efficiency without using the ordinary pixel-by-pixel Z-buffers. The representative Z values of the reduced Z-buffer are carefully updated only after it is confirmed that pixel blocks are entirely covered with object polygons and that the polygons lie in front. This makes it possible to obtain the reduced Z-buffer causing no damage, without using the pixel-by-pixel Z-buffer.

Various modifications may be made to the foregoing embodiment. Some modifications will be described below.

[3.1] Front Board and Rear Board

In the foregoing description, an object 200 is provided with double bounding volumes, i.e., the external volume 400 and the internal volume 300. The Z culling test is performed using the external volume 400 while the representative Z values of the reduced Z-buffer are updated using the internal volume 300. In another embodiment, the double bounding boards consisting of a front board and a rear board may be provided to sandwich the object in the depth direction from the front and the back as seen from the point of view. Here, the front board is used to perform the Z culling test, and the rear board is used to update the representative Z values of the reduced Z-buffer.

Figure 14A:
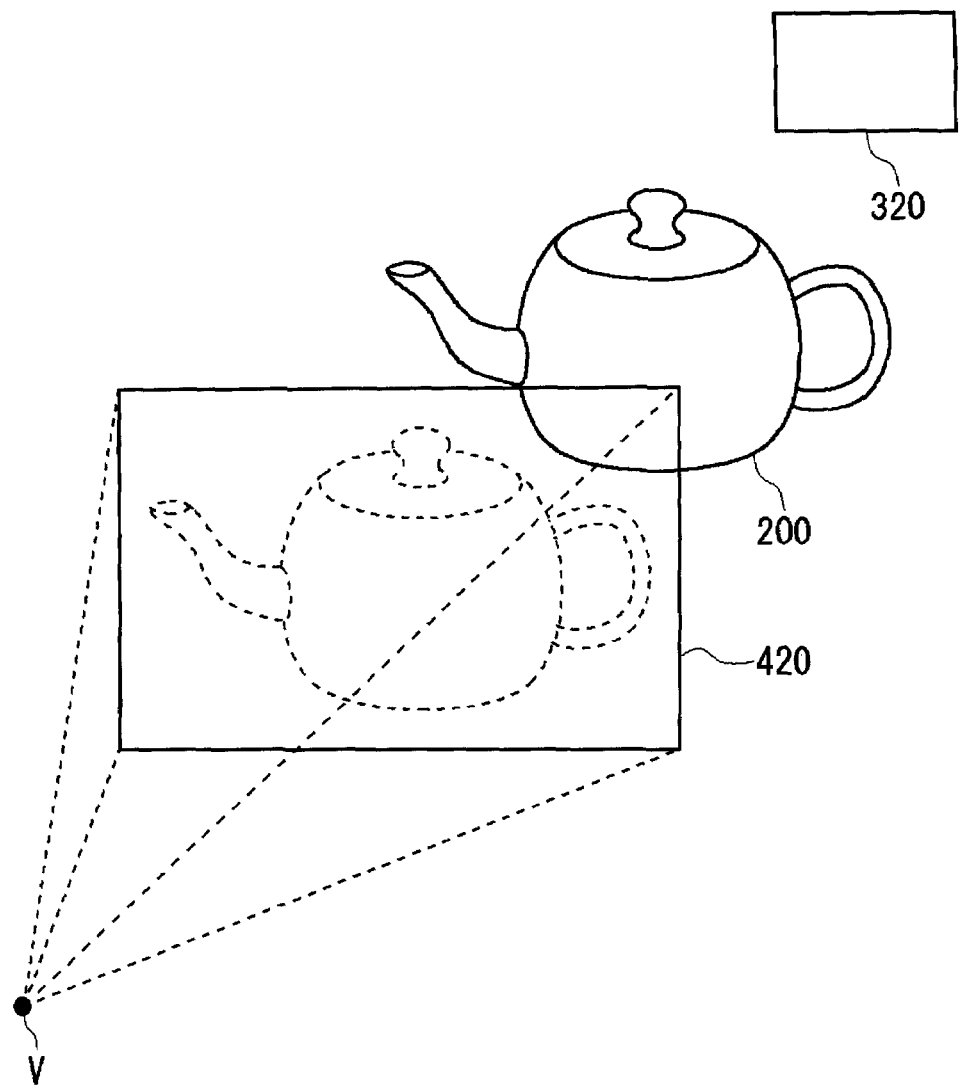
FIGS. 14A and 14B show a front board and a rear board provided for an object.
Figure 14B:
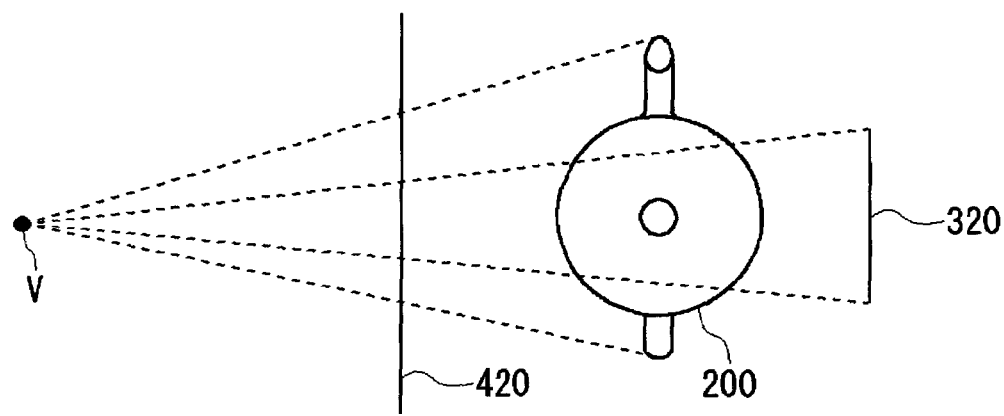

FIGS. 14A and 14B show a front board 420 and a rear board 320 provided for the object 200. As shown in FIG. 14A, the front board 420 lies in front of the object 200 so as to hide the object 200 behind as seen from the point of view V. The rear board 320 lies behind the object 200 so as to be hidden behind the object 200. When seen from the point of view V, the object 200 is entirely hidden behind the front board 420. The rear board 320 is entirely hidden behind the object 200. FIG. 14B shows the positional relationship between the object 200, the front board 420, and the rear board 320 with respect to the point of view V as seen from the top.

The front board 420 entirely hides the object 200 as seen from the point of view V, and thus it provides the same effect as the external volume 400 in the Z culling test. The above-mentioned method for the Z culling test can therefore be applied to the front board 420. The rear board 320 is entirely hidden behind the object 200 as seen from the point of view V, and thus it provides the same effect as the internal volume 300 when the reduced Z-buffer 500 is updated. The above-mentioned method for updating the representative Z values of the reduced Z-buffer 500 can therefore be applied to the read board 320.

For example, the front board 420 may be a rectangle having the minimum size capable of surrounding the entire outline of the object 200 projected on the drawing plane. The rear board 320 may be a rectangle having the maximum size capable of being entirely surrounded by the outline of the object 200. Otherwise, the front board 420 and the rear board 320 may have arbitrary shapes, or may be shaped close to the outline of the object 200. The closer to the outline of the object 200 the front board 420 and the rear board 320 are shaped, the higher the culling efficiency can be. The closer to the object 200 the front board 420 and the rear board 320 are placed in front of and behind the object 200 respectively, the higher the culling efficiency can be.

In terms of processing cost, it is much easier to generate the front board 420 and the rear board 320 for the object 200 than to generate the external volume 400 and the internal volume 300 for the object 200. The front board 420 and the rear board 320 are also easy to rasterize so that the Z culling test and updating of the representative Z values of the reduced Z-buffer 500 can be performed at high speed.

If the point of view moves, the object 200 could fail to be hidden behind the front board 420, or the rear board 320 could be seen behind the object 200. When the position of the point of view is thus changed, the front board 420 and the rear board 320 will need to be set again. In this respect, the external volume 400 and the internal volume 300 remain the double bounding volumes that confine the object 200 from outside and inside no matter which point of view is taken, and therefore these volumes need not be set again even when the point of view moves. For this reason, if the point of view moves, it is more preferable to use the external volume 400 and the internal volume 300.

When the object 200 moves, the external volume 400 and the internal volume 300 must be rasterized again causing a heavy processing load. In contrast, the front board 420 and the rear board 320 are easier to set again even when the object 200 moves, resulting in a less processing load. In such a situation that the object 200 moves frequently, it is more preferable to use the front board 420 and the rear board 320.

[3.2] Omission of Components

The foregoing embodiment has dealt with the method for providing the object 200 with double bounding volumes, or the external volume 400 and the internal volume 300, and approximating the object 200 in the depth direction and performing a Z culling test while updating the reduced Z-buffer 500. The internal volume 300, which is entirely included inside the object 200, is used to create the reduced Z-buffer 500, and the reduced Z-buffer 500 is used to perform a culling test based on the external volume 400 that entirely includes the object 200. This guarantees that the object 200, if it is to be rendered, will never be culled out by mistake.

The occlusion culling method using the reduced Z-buffer 500 and the double bounding volumes has the following advantages in terms of memory capacity and processing load.

(A) Since the bounding volumes in use have less complexities than the actual object 200, it is possible to store the polygon models with a smaller memory capacity, and also rasterize the polygon models at higher speed.

(B) Since the reduced Z-buffer 500 is used to perform a Z test in units of pixel blocks, the required memory capacity and the number of operations are smaller as compared to pixel-by-pixel Z test using an ordinary Z-buffer.

As some possible modifications of the embodiment, the following methods can be adopted.

(1) A method for occlusion culling in which the double bounding volumes are rasterized in an ordinary Z-buffer instead of using the reduced Z-buffer 500, or (2) A method for occlusion culling in which the object 200 is rasterized in the reduced Z-buffer 500 instead of using the double bounding volumes.

In other words, the present invention may be practiced even when either the reduced Z-buffer 500 or the double bounding volumes is omitted from its components.

If the reduced Z-buffer 500 is omitted, the foregoing advantage (B) attributable to implementing the reduced Z-buffer 500 is lost while the foregoing advantage (A) attributable to implementing the double bounding volumes remains. If the double bounding volumes are omitted, the foregoing advantage (A) attributable to the double bounding volumes is lost while the foregoing advantage (B) attributable to the reduced Z-buffer 500 remains. In either case, the objective of occlusion culling can still be achieved, while part of the advantages is lost.

Similarly, when the front board 420 and the rear board 320, or double bounding boards are used, the objective of occlusion culling can also be achieved even if the reduced Z-buffer is omitted from the components.

While the embodiment has dealt with a method for performing culling in units of objects, the present invention may also be applied when performing culling in units of object-constituting fragments such as polygons. The Z culling using the reduced Z-buffer according to the embodiment is not limited to units of objects, but is also applicable in units of primitives. In the embodiment the occlusion culling is intended to select an object that is hidden behind the other objects and invisible from the point of view and to exclude the object in advance from rendering targets. Alternatively, the reduced Z-buffer according to the embodiment may be used with a hidden surface removal method for detecting and removing an object surface that is hidden behind the other objects, i.e., a hidden surface. The reduced Z-buffer of the embodiment is thus applicable not only to the occlusion culling in units of objects but also applicable to the hidden surface removal for removing hidden surfaces of the objects, resulting in an improvement in the processing efficiency of the Z culling.

Furthermore, various types of rendering processing using a hierarchical Z-buffer can adopt the reduced Z-buffer of the embodiment instead of the hierarchical Z-buffer. Such a configuration is advantageous in terms of the amount of calculation and the memory capacity, because the lower resolution reduced Z-buffer is directly produced without using a pixel-by-pixel Z-buffer, according to the foregoing embodiment.

[4] Configuration of Rendering Processing Apparatus

Hereinafter, a description will be given of the configuration and operation of a rendering processing apparatus 100 which uses the occlusion culling method according to the foregoing embodiment and its modifications. The configuration of the rendering processing apparatus 100 will be described with reference to FIGS. 15 to 17. The figure shows a block diagram focused on functions. These function blocks may be realized in various forms such as hardware only, software only, or a combination thereof.

Figure 15:
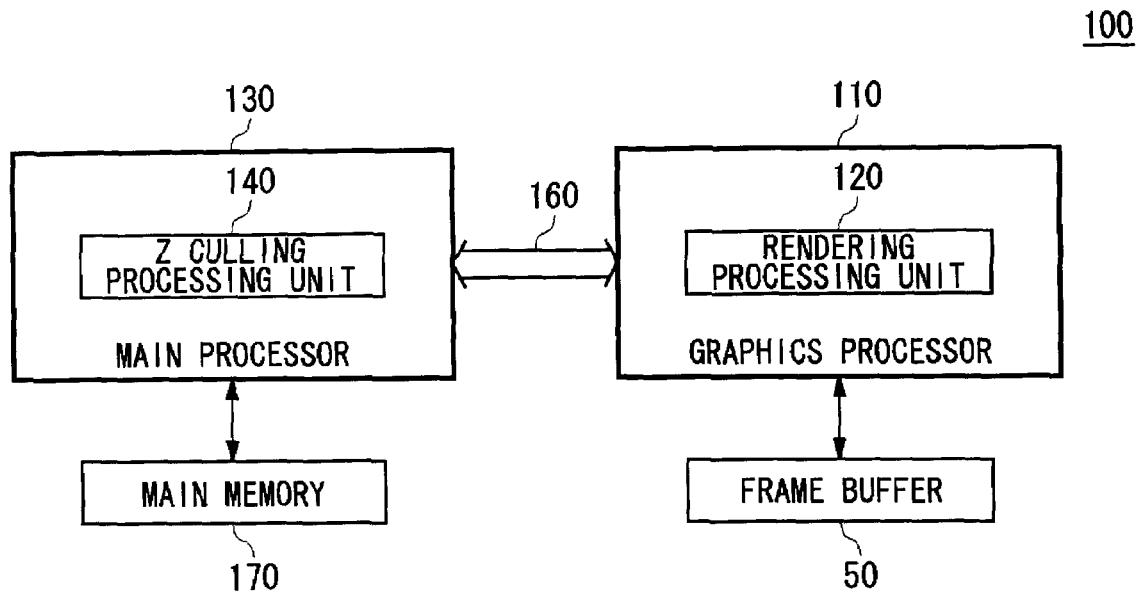
FIG. 15 is a block diagram of a rendering processing apparatus according to an embodiment.

FIG. 15 is a block diagram of the rendering processing apparatus 100 according to the embodiment. The rendering processing apparatus 100 performs rendering processing for generating rendering data to be displayed on a two-dimensional screen based on three-dimensional model information. The rendering processing apparatus 100 is composed of a main processor 130 and a graphics processor 110 which are connected to each other via an input and output interface 160. The main processor 130 uses a main memory 170 for its storage area, and executes arithmetic processing such as geometric operations. The graphics processor 110 uses a frame buffer 50 for its storage area, and executes rasterization and rendering processing such as shading algorithm.

The main processor 130 includes a Z culling processing unit 140. The graphics processor 110 includes a rendering processing unit 120. The main processor 130 reads data on a plurality of objects to be rendered from an external storage device or the like, and stores them in the main memory 170. The Z culling processing unit 140 uses a reduced Z-buffer to perform Z culling processing so that a hidden object behind the other objects are excluded from rendering targets. The objects that have a possibility of being rendered are supplied to the graphics processor 110 through the I/O interface 160. The rendering processing unit 120 rasterizes the objects that have a possibility of being rendered, and then renders them in the frame buffer 50.

Figure 16:
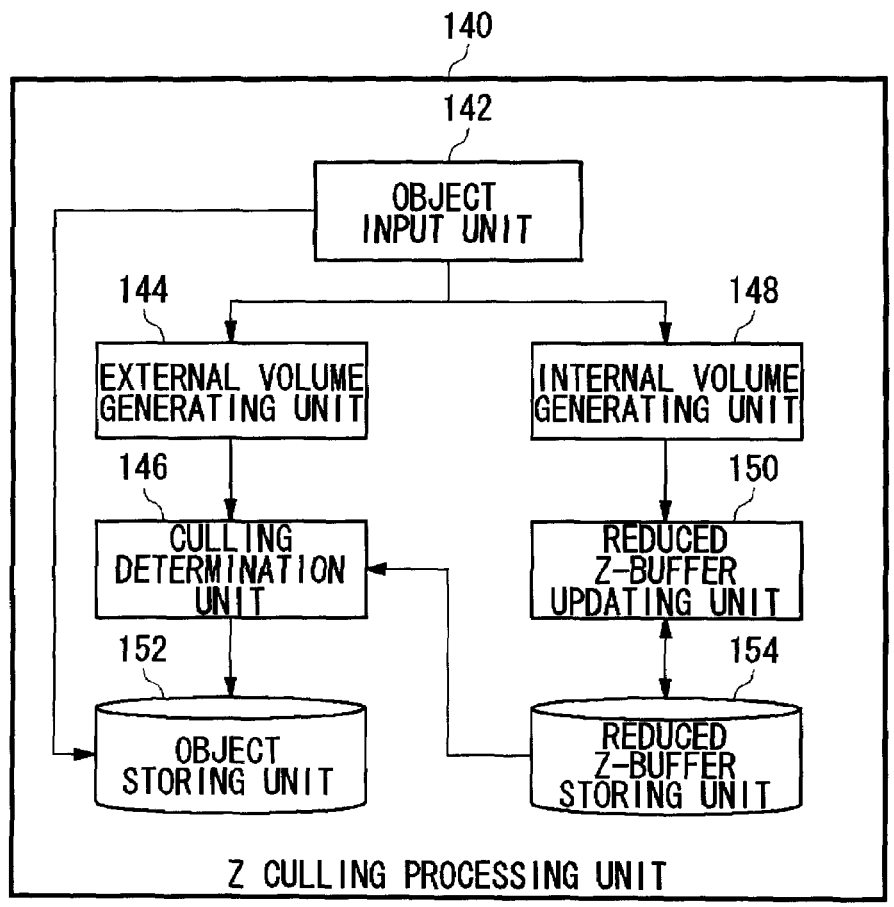
FIG. 16 is a block diagram of the Z culling processing unit of FIG. 15.

FIG. 16 is a block diagram of the Z culling processing unit 140. An object input unit 142 inputs a plurality of objects to be rendered, and stores them in an object storing unit 152 as a set of objects.

An internal volume generating unit 148 generates an internal volume 300 that is included inside an input object 200, and supplies it to a reduced Z-buffer updating unit 150. Based on the internal volume 300, the reduced Z-buffer updating unit 150 updates the reduced Z-buffer 500 stored in a reduced Z-buffer storing unit 154. The process performed by the reduced Z-buffer updating unit 150 for updating the representative Z values of the reduced Z-buffer 500 is the same as described in section [2.3]. The reduced Z-buffer updating unit 150 stores the updated reduced Z-buffer 500 into the reduced Z-buffer storing unit 154.

An external volume generating unit 144 generates an external volume 400 that includes the object 200 subject to a culling test, and supplies it to a culling determination unit 146. The culling determination unit 146 consults the reduced Z-buffer 500 stored in the reduced Z-buffer storing unit 154, and performs the Z culling test on the object 200 based on the external volume 400. The Z culling test performed by the culling determination unit 146 is the same as described in section [2.2]. The culling determination unit 146 eliminates the object that is excluded from rendering targets by Z culling test, from the set of objects stored in the object storing unit 152. The Z culling processing unit 140 supplies the set of objects, each having a possibility of being rendered and being stored in the object storing unit 152, to the rendering processing unit 120.

Figure 17:
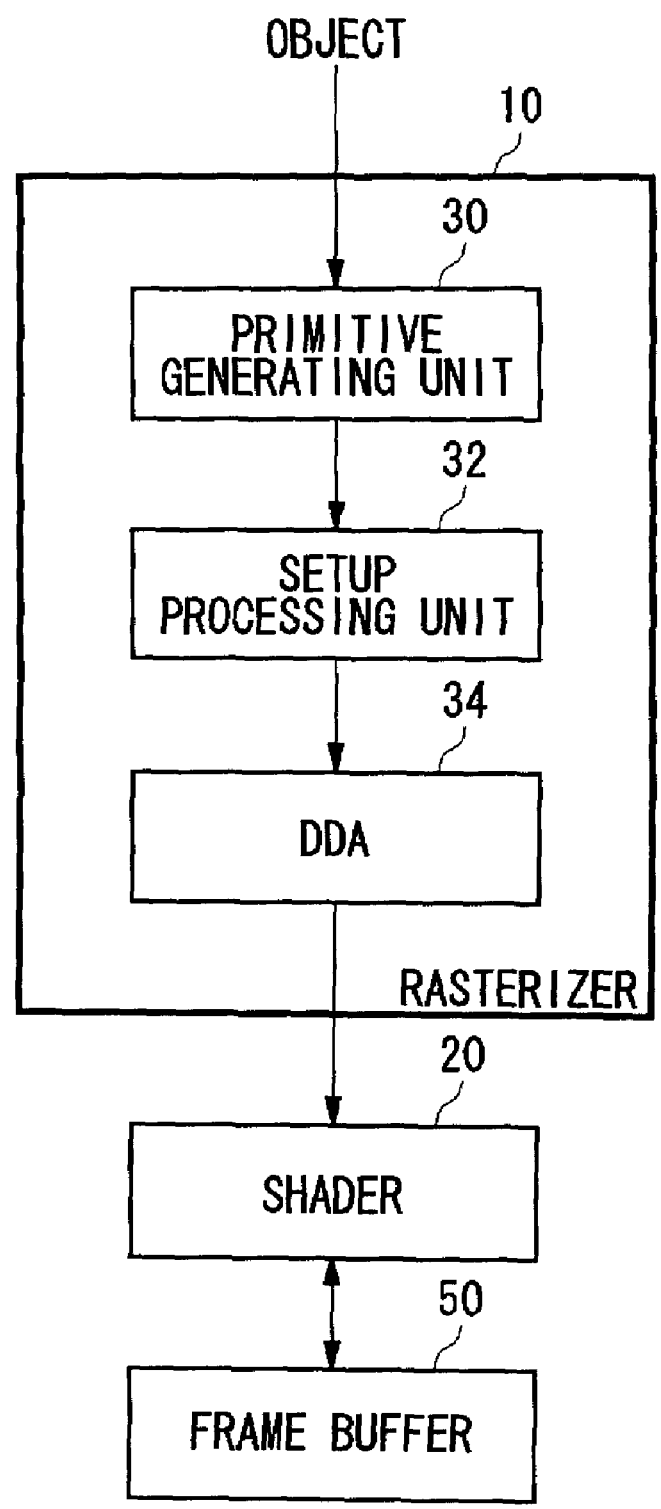
FIG. 17 is a block diagram of the rendering processing unit of FIG. 15.

FIG. 17 is a block diagram of the rendering processing unit 120. The rendering processing unit 120 includes a rasterizer 10 and a shader 20. The objects that have a possibility of being rendered are input to the rasterizer 10. The rasterizer 10 includes a primitive generating unit 30, a setup processing unit 32, and a DDA 34.

Based on polygon information on an input object, the primitive generating unit 30 generates a stream that contains the vertex coordinates and parameters of one or more primitives constituting the object, and supplies the stream to the setup processing unit 32. A primitive is a rendering unit in a form of a geometric figure such as a point, line, triangle, or rectangle used when a three-dimensional object is represented in a polygonal model.

The setup processing unit 32 sets up various types of parameters for processing the stream of primitives with a digital differential analyzer (DDA). Specifically, it sets bounding boxes for defining a space including the primitives, and various types of DDA processing parameters such as edge coefficients.

The setup processing unit 32 supplies the set primitive data to the DDA 34. The DDA 34 performs DDA processing on the primitives supplied from the setup processing unit 32 based on the various types of parameters set by the setup processing unit 32, thereby converting them into pixel data corresponding to the drawing screen.

Primitives may have a triangular shape, for example. The DDA 34 performs view conversion for converting triangles in three-dimensional space into triangles on the drawing plane through projection transformation. The DDA 34 also scans the drawing plane for triangles in the horizontal direction of the drawing plane while converting them into quantized pixels with respect to each raster line. In the DDA 34, primitives are developed into pixels. Pixel data is calculated for each of the pixels, including color values which are expressed in three primary colors RGB, an alpha value which indicates a transparency, a Z value which indicates a depth, and UV coordinate values which are parametric coordinates for accessing texture attributes.

The shader 20 performs shading processing to determine the color values of the pixels based on the pixel data calculated by the rasterizer 10. When performing further texture mapping, the shader 20 synthesizes the color values of textures to calculate the final color values of the pixels, and writes the pixel data to the frame buffer 50.

The shader 20 also performs fogging, alpha-blending, and other processing on the rendering data retained in the frame buffer 50, thereby determining the final color values of the pixels and updating the pixel data in the frame buffer 50.

The frame buffer 50 is a buffer in which the pixel data generated by the shader 20 are stored in screen coordinates. The stored pixel data may be either a final rendering image or an intermediate image in the process of shading processing. The pixel data stored in the frame buffer 50 are output to and displayed on a display unit.

In the foregoing description, the Z culling processing unit 140 is provided in the main processor 130. Since the external volume generating unit 144 and the internal volume generating unit 148 of the Z culling processing unit 140 rasterize the external volume 400 and the internal volume 300, respectively, the process could be performed by the rasterizer 10 of the rendering processing unit 120. For this reason, the Z culling processing unit 140 may be provided in the graphics processor 110 so that each component of the Z culling processing unit 140 can be realized by utilizing the arithmetic functions of the rasterizer 10 and the shader 20. In this case, multipass rendering techniques may be used so that the objects that have no possibility of being rendered can be culled out in the first operation pass, and only the objects that have a possibility of being rendered can be input and rendered in the subsequent operation pass.

Figure 18:
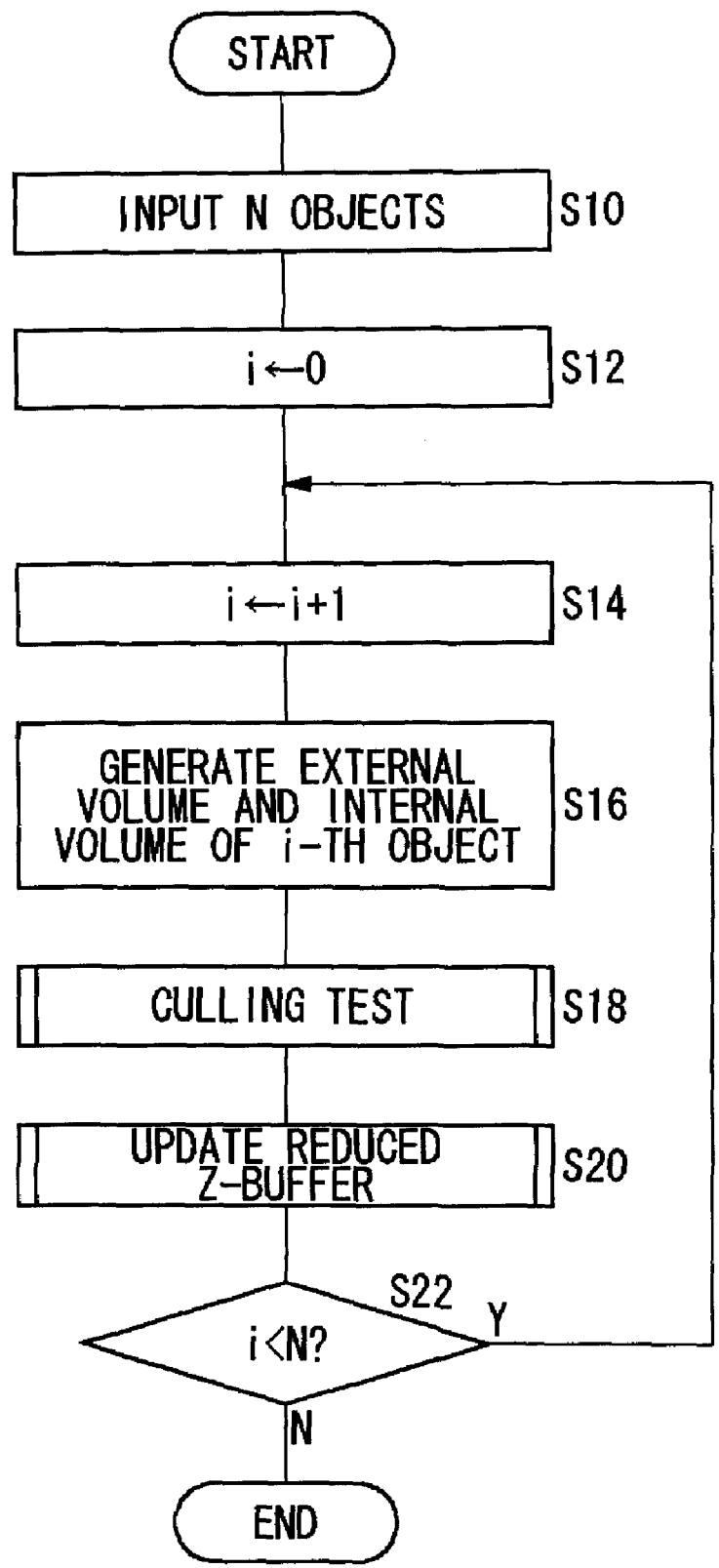
FIG. 18 is a flowchart for explaining the procedure of Z culling processing to be performed by the Z culling processing unit of FIG. 16.

FIG. 18 is a flowchart for explaining the procedure of the Z culling processing by the Z culling processing unit 140. The object input unit 142 inputs N objects (S10). The object input unit 142 initializes a variable i for counting the processed objects to zero (S12). The object input unit 142 increments the variable i by one (S14), and supplies the i-th object to the external volume generating unit 144 and the internal volume generating unit 148.

The external volume generating unit 144 generates an external volume which includes the i-th object. The internal volume generating unit 148 generates an internal volume which is included inside the i-th object (S16).

The culling determination unit 146 performs the Z culling test using the reduced Z-buffer 500, based on the external volume which includes the i-th object (S18). The internal volume generating unit 148 updates the reduced Z-buffer 500 based on the internal volume which is included inside the i-th object (S20).

If the variable i is smaller than the total number N of objects (Y at S22), the procedure returns to step S14. If the variable i reaches the total number N of objects (N at S22), the procedure ends.

In the foregoing procedure, the Z culling test is performed by using the external volume which includes the i-th object, and then the reduced Z-buffer 500 is updated using the internal volume which is included in the i-th object. However, the culling test and the updating of the reduced Z-buffer 500 need not be performed in this order since they can be executed independently. Moreover, all the objects need not necessarily be subject to both the Z culling test and the updating of the reduced Z-buffer 500. One set of objects may be used for updating the reduced Z-buffer 500 while another different set of objects may be subject to Z culling test.

For example, the reduced Z-buffer 500 may be updated for the objects having a larger size or for the objects known beforehand to lie in front, while the objects having a smaller size or the objects known beforehand to lie behind may be omitted as appropriate. It can help a reduction in the processing cost.

The objects subject to Z culling test may also be selected as appropriate. For example, the culling test may be performed with priority given to the objects known beforehand to lie behind, or with a focus on the objects that are heavy to process.

Figure 19:
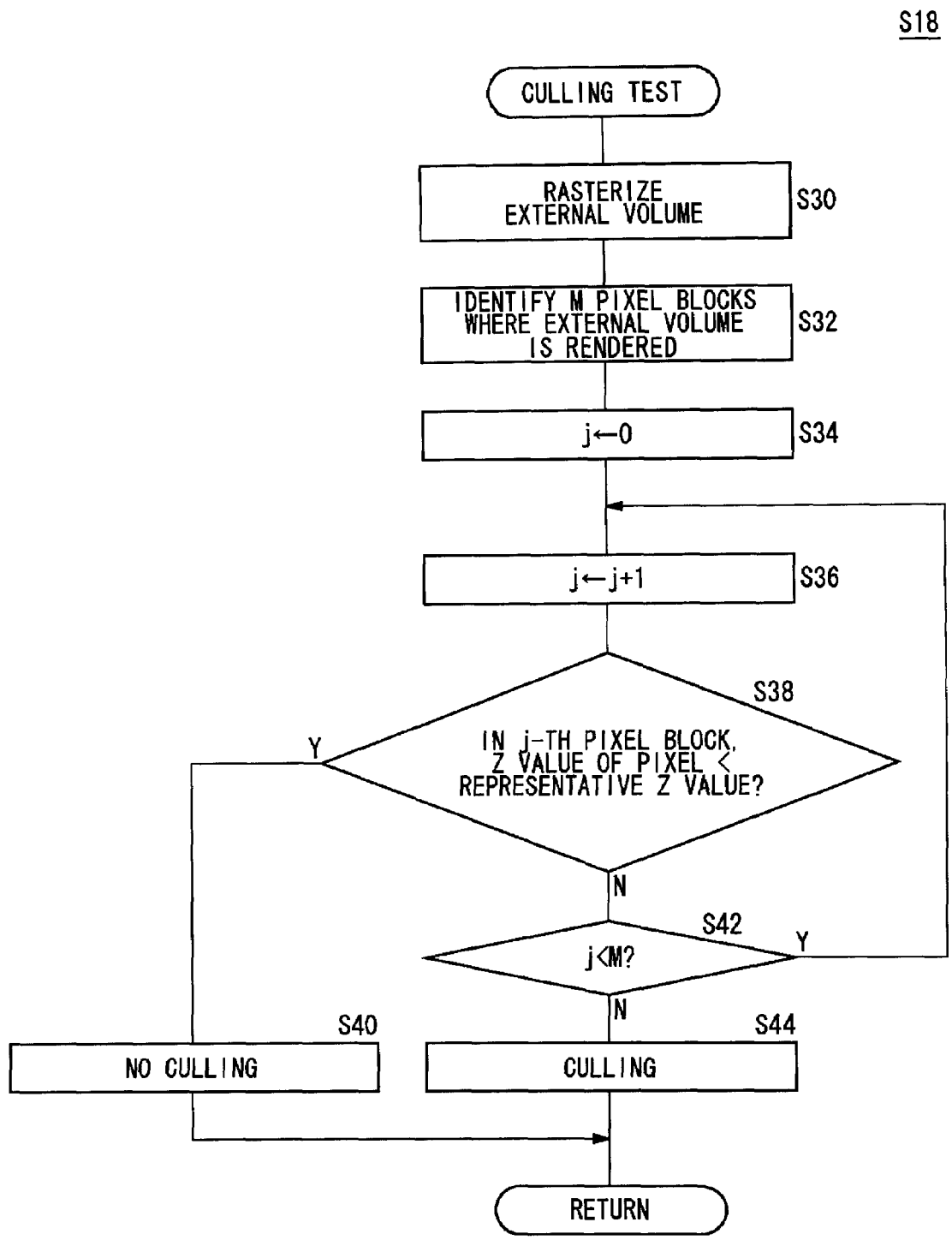
FIG. 19 is a flowchart showing the procedure of culling test performed by the culling determination unit of FIG. 16.

FIG. 19 is a flowchart showing the procedure of culling test performed by the culling determination unit 146 at step S18. The culling determination unit 146 rasterizes the external volume of the object (S30), and identifies M pixel blocks in which the external volume is rendered (S32). A variable j for counting the processed pixel blocks is initialized to zero (S34).

The variable j is incremented by one (S36). If it turns out that one of pixels of the external volume in the j-th pixel block has a Z value smaller than the representative Z value of this pixel block (Y at S38), the culling determination unit 146 determines not to perform culling (S40) since this object has a possibility of being rendered.

If none of the pixels of the external volume in the j-th pixel block has a Z value smaller than the representative Z value of the pixel block (N at S38), the culling determination unit 146 does not determine that the object is a rendering target for this pixel block. If the variable j is smaller than the total number M of pixel blocks (Y at S42), the procedure returns to step S36 to continue the Z test on the rest of the pixel blocks. Finally, if it turns out that all the pixels of the external volume for all of the M pixel blocks have Z values greater than or equal to the representative Z values of the respective pixel blocks (N at S38 and N at S42), the culling determination unit 146 performs culling (S44) since this object has no possibility of being rendered.

The culling test ends when it is determined whether or not to cull out the object (S40 or S44).

Figure 20:
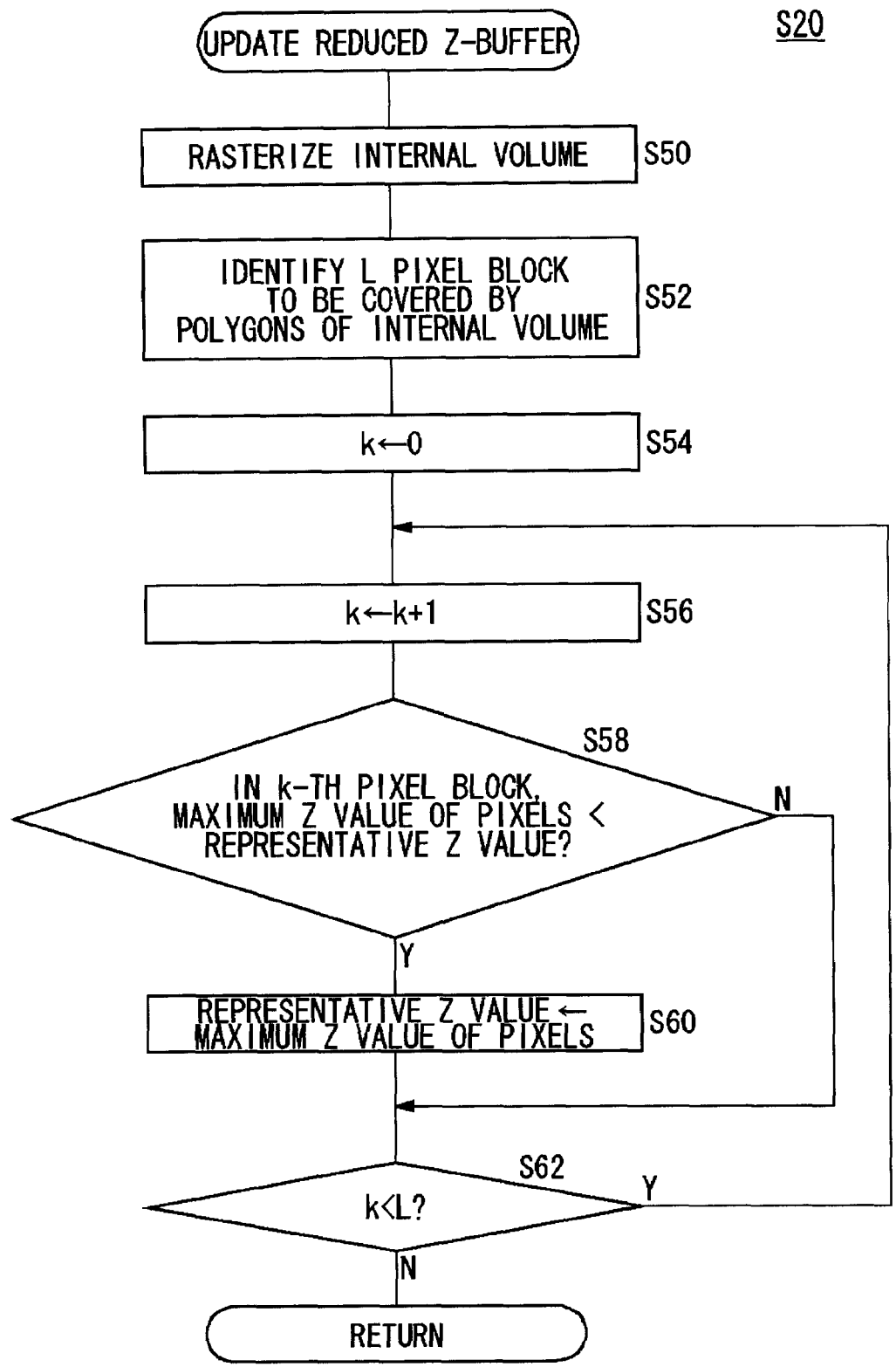
FIG. 20 is a flowchart showing the procedure performed by the reduced Z-buffer updating unit of FIG. 16 for updating a reduced Z-buffer.

FIG. 20 is a flowchart showing the procedure performed by the reduced Z-buffer updating unit 150 for updating the reduced Z-buffer 500 at step S20. The reduced Z-buffer updating unit 150 rasterizes the internal volume of the object (S50), and identifies L pixel blocks as being covered by the polygons of the internal volume (S52). A variable k for counting the processed pixel blocks is initialized to zero (S54).

The variable k is incremented by one (S56). If the largest per-pixel Z value within the k-th pixel block is smaller than the representative Z value of this pixel block (Y at S58), the reduced Z-buffer updating unit 150 updates the representative Z value with the largest per-pixel Z value (S60). If the variable k is smaller than the total number L of pixel blocks (Y at S62), the procedure returns to step S56 to perform the Z test on the rest of the pixel blocks. If the variable k reaches the total number L of pixel blocks (N at S62), the procedure ends.

If the largest per-pixel Z value within the k-th pixel block is greater than or equal to the representative Z value of this pixel block (N at S58), the reduced Z-buffer updating unit 150 does not update the representative Z value and the procedure proceeds to step S62.

The present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention.

What is claimed is:

1. A reduced Z-buffer generating method comprising:
   providing a reduced Z-buffer that stores, in a non-hierarchical manner, representative Z values for determining a positional relationship between plural objects or fragments constituting the objects in a depth direction, each representative Z value indicating one depth value, from a point of view, for a unit of once-grouped predetermined pixel blocks, each including a plurality of neighboring pixels; and
   comparing the Z values of respective rasterized pixels in a pixel block of an object or a fragment to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block,
   wherein the representative Z value of the pixel block in the reduced Z-buffer is updated only if the object or the fragment is rendered on all the pixels within the pixel block, and
   wherein when comparing the Z values of the rasterized pixels in the pixel block of the object or fragment to be rendered with the representative Z value of the corresponding pixel block stored in the reduced Z-buffer, the representative Z value is exclusively compared with: a Z value of a pixel at a vertex of a polygon of the object or fragment falling within the pixel block; a Z value of a pixel at an intersection between an edge of the polygon and a border of the pixel block; and the Z values of pixels located at the pixel block corners, among the four corners falling within the polygon.

2. An occlusion culling method for excluding from rendering targets, an object hidden behind other objects as seen from a point of view, when given a plurality of objects, the method comprising:
   providing a reduced Z-buffer that stores, in a non-hierarchical manner, representative Z values for determining the positional relationship between the objects in a depth direction, each representative Z value indicating one depth value, from a point of view, for a unit of once-grouped predetermined pixel blocks, each including a plurality of neighboring pixels;
   comparing the Z values of respective rasterized pixels in a pixel block of an object to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block;
   determining that the object has a possibility of being rendered if it turns out that at least one of the pixel blocks of the object to be rendered has any rasterized pixel having a Z value that indicates lying closer to the point of view than the representative Z value of a corresponding pixel block stored in the Z-buffer does; and
   determining that the object has a possibility of being culled if, for every pixel block of the object to be rendered, a most significant per-pixel Z value, which indicates lying closest to the point of view among the per-pixel Z values in the every pixel block, indicates lying farther from the point of view than the representative Z value of the corresponding pixel block stored in the reduced Z-buffer does, wherein when comparing the per-pixel Z values in a pixel block of the objects determined whether to be culled with the representative Z value of the corresponding pixel block stored in the reduced Z-buffer, the representative Z value is exclusively compared with: a Z value of a pixel at a vertex of a polygon of the external volume falling within the pixel block; a Z value of a pixel at an intersection between an edge of the polygon and a border of the pixel block; and a Z value of a pixel allocated at the pixel block corners, among the four corners falling within the polygon.

3. A hidden surface removal method for removing a hidden surface behind another object as seen from a point of view, when given a plurality of objects, the method comprising:

providing a reduced Z-buffer that stores, in a non-hierarchical manner, representative Z values for determining the positional relationship between fragments constituting the plurality of objects in a depth direction, each representative Z value indicating one depth value, from a point of view, for a unit of once-grouped predetermined pixel blocks, each including a plurality of neighboring pixels;

comparing the Z values of respective rasterized pixels in a pixel block of a fragment to be rendered with the representative Z value of a corresponding pixel block stored in the reduced Z-buffer, and updating the representative Z value of the pixel block with a farthest Z value if the farthest Z value indicates lying closer to the point of view than the representative Z value of the pixel block does, the farthest Z value indicating lying the farthest from the point of view among the per-pixel Z values in the pixel block; and determining that the fragment has the possibility of being rendered if it turns out that at least one of the pixel blocks of the fragment to be rendered has any rasterized pixel having a Z value that indicates lying closer to the point of view than the representative Z value of a corresponding pixel block stored in the Z-buffer does, wherein the fragment is excluded from rendering targets if for every pixel block of the fragment to be rendered a most significant per-pixel Z value, which indicates lying closest to the point of view among the per-pixel Z values in the every pixel block, indicates lying farther from the point of view than the re representative Z value of the corresponding pixel block stored in the reduced Z-buffer does, and wherein when comparing the per-pixel Z values in a pixel block of the fragments with the representative Z value of the corresponding pixel block stored in the reduced Z-buffer, the representative Z value is exclusively compared with: a Z value of a pixel at a vertex of a polygon of the external volume falling within the pixel block; a Z value of a pixel at an intersection between an edge of the polygon and a border of the pixel block; and a Z value of a pixel located at a pixel block corner, among the four corners falling within the polygon.

* * * * *